(12) United States Patent
Lee et al.

(10) Patent No.: US 9,405,142 B2
(45) Date of Patent: Aug. 2, 2016

(54) LIQUID CRYSTAL DISPLAY AND MANUFACTURING METHOD THEREOF

(71) Applicant: Samsung Display Co., Ltd., Yongin, Gyeonggi-Do (KR)

(72) Inventors: Soo Jung Lee, Yongin-si (KR); Hee-Keun Lee, Suwon-si (KR)

(73) Assignee: Samsung Display Co., Ltd. (KR)

( * ) Notice: Subject to any disclaimer, the term of this patent is extended or adjusted under 35 U.S.C. 154(b) by 109 days.

(21) Appl. No.: 14/481,591

(22) Filed: Sep. 9, 2014

(65) Prior Publication Data
US 2015/0301397 A1    Oct. 22, 2015

(30) Foreign Application Priority Data
Apr. 18, 2014 (KR) .................. 10-2014-0046962

(51) Int. Cl.
*G02F 1/1333* (2006.01)
*G02F 1/1341* (2006.01)

(52) U.S. Cl.
CPC ........ *G02F 1/133377* (2013.01); *G02F 1/1333* (2013.01); *G02F 1/1341* (2013.01); *G02F 1/133345* (2013.01)

(58) Field of Classification Search
CPC ............ G02F 1/1333; G02F 1/133377; G02F 1/133345; G02F 1/1341
See application file for complete search history.

(56) References Cited

U.S. PATENT DOCUMENTS

| | | | |
|---|---|---|---|
| 2013/0248086 A1* | 9/2013 | Hamada | G02F 1/1339 156/145 |
| 2014/0204316 A1* | 7/2014 | Kim | G02F 1/133377 349/84 |
| 2015/0160506 A1* | 6/2015 | Park | G02F 1/133377 349/138 |

FOREIGN PATENT DOCUMENTS

| | | |
|---|---|---|
| KR | 10-2012-0026880 | 3/2012 |
| KR | 10-2014-0071550 | 6/2014 |

* cited by examiner

*Primary Examiner* — Anne Hines
(74) *Attorney, Agent, or Firm* — Innovation Counsel LLP

(57) ABSTRACT

The inventive concept provides a liquid crystal display including an insulation substrate; a roof layer which is formed on the insulation substrate; a pixel electrode which is formed on the insulation substrate and under the microcavity supported by the roof layer; and a liquid crystal layer which is disposed in the microcavity. The opening corresponding to unit microcavity includes portions having a first width and a second width. According to the inventive concept, configurations of the pixel and the opening which may minimize the remaining liquid crystal are provided to adjust a size of the liquid crystal injection hole between a plurality of microcavities into which the liquid crystal is injected, which may prevent an orientation error of the liquid crystal caused by the remaining liquid crystal outside the microcavity and thus prevent the display error.

10 Claims, 31 Drawing Sheets

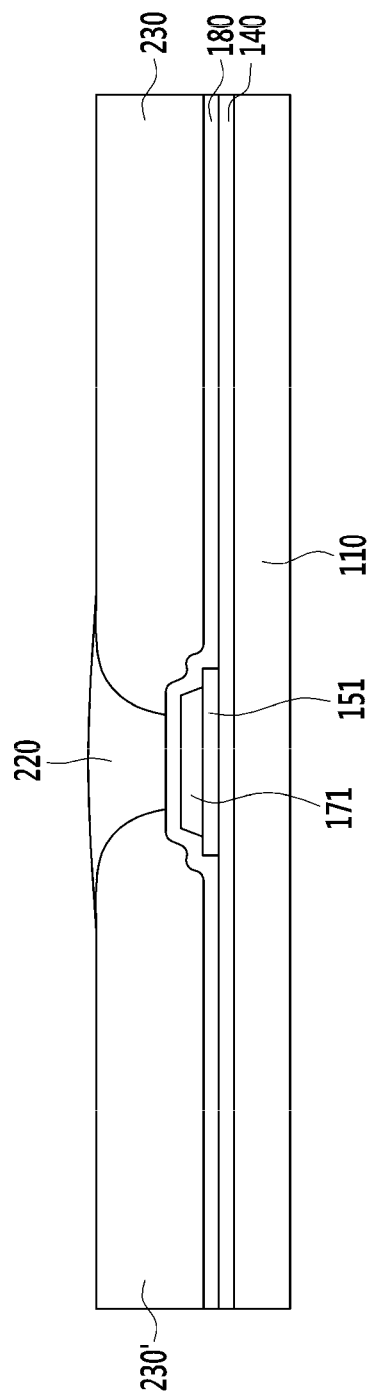

LIQUID CRYSTAL DISPLAY AND MANUFACTURING METHOD THEREOF

CROSS-REFERENCE TO RELATED APPLICATION

This application claims priority to and the benefit of Korean Patent Application No. 10-2014-0046962 filed in the Korean Intellectual Property Office on Apr. 18, 2014, the entire contents of which are incorporated herein by reference.

BACKGROUND (a) Field

The inventive concept relates to a liquid crystal display and a manufacturing method thereof and, more particularly, to a liquid crystal display having a liquid crystal layer (nano crystal) which is present in a microcavity and a manufacturing method thereof.

(b) Description of the Related Art

A liquid crystal display is one of the flat panel displays which are most widely used in recent years and is a display device which includes two display panels in which a field generating electrode such as a pixel electrode or a common electrode is formed and a liquid crystal layer interposed between the two display panels.

A voltage is applied between the field generating electrodes to generate an electric field in the liquid crystal layer, an orientation of liquid crystal molecules of the liquid crystal layer is determined by the electric field and polarization of incident light is controlled to display an image.

A liquid crystal display having an embedded microcavity (EM) structure (nano crystal structure) forms a sacrificial layer using a photo resist and coats an upper portion with a supporting member, and then removes the sacrificial layer and fills an empty space formed by removing the sacrificial layer with liquid crystal to manufacture a display.

However, when the liquid crystal is injected in the EM structure, liquid crystal which is not injected into the EM structure remains on the upper portion of the microcavity, which may cause display error.

The above information disclosed in this Background section is only for enhancement of understanding of the background of the inventive concept and therefore it may contain information that does not form the prior art.

SUMMARY

The inventive concept has been made in an effort to provide a liquid crystal display having a liquid crystal layer (nano crystal) which is present in a microcavity, which provides a configuration of a pixel and an opening which may minimize remaining liquid crystal to adjust size of a liquid crystal injecting hole between a plurality of microcavities into which the liquid crystal is injected to prevent the degradation of the performance of the display such as an image quality error caused by the remaining liquid crystal and a manufacturing method thereof.

An exemplary embodiment of the inventive concept provides a liquid crystal display including an insulation substrate; a roof layer which is formed on the insulation substrate and supports a plurality of microcavities; a pixel electrode which is formed on the insulation substrate and under the microcavity supported by the roof layer; and a liquid crystal layer which is disposed in the microcavity in which the roof layer has an opening through which liquid crystal is injected into the plurality of microcavities, the opening corresponding to unit microcavity includes a first portion having a first width and a second portion having a second width which is different from the first width and the first portion is wider than the second portion.

The openings in adjacent two microcavities share a line of symmetry.

A width of the opening decreases linearly from the first portion to the second portion.

In the opening, the first portion and the second portion are repeatedly formed.

The first portion and the second portion have a predetermined length in a first direction and uniform first width and second width in a second direction substantially perpendicular to the first direction, respectively, and the first portion and the second portion are repeatedly formed.

One pixel includes two first portions and two second portions, the two first portions are disposed in a diagonal direction and the two second portions are disposed in a diagonal direction.

One pixel includes two first portions and two second portions, the two first portions are disposed in a same side of the pixel and the two second portions are disposed in a same side of the pixel.

One pixel includes two first portions and four second portions, the two first portions are disposed on a center of the pixel and the four second portions are disposed on both sides of the two first portions.

The first portion is formed in a position corresponding to one microcavity, and the second portions are formed in a position corresponding to two microcavities.

The liquid crystal display may further include a common electrode which is disposed on an upper portion and a side wall portion of the microcavity.

Another exemplary embodiment of the inventive concept provides a manufacturing method of a liquid crystal display including: forming a sacrificial layer which is divided for every pixel on an insulation substrate; forming a common electrode on an entire insulating substrate on which the sacrificial layer is formed; forming a roof layer which includes a first portion having a first width and a second portion having a second width to inject liquid crystal, on the common electrode; removing the sacrificial layer and the common electrode which are formed in the opening to form a microcavity; and injecting the liquid crystal into the microcavity which is supported by the roof layer through the first portion, in which the first portion is wider than the second portion.

According to an exemplary embodiment of the inventive concept, configurations of the pixel and the opening which may minimize the remaining liquid crystal are provided to adjust a size of the liquid crystal injection hole between a plurality of microcavities into which the liquid crystal is injected, which may prevent an orientation error of the liquid crystal caused by the remaining liquid crystal outside the microcavity and thus prevent the display error.

BRIEF DESCRIPTION OF THE DRAWINGS

FIGS. 9, 10, 11, 12A, 12B, 13A, 13B, 14A, 14B, 14C, 15A, 15B, 15C, 16A, 16B, 16C, 17A, 17B, 17C, 18A, 18B, 18C, and 18D are views sequentially illustrating a manufacturing method of a liquid crystal display according to an exemplary embodiment of the inventive concept.

DETAILED DESCRIPTION OF THE EMBODIMENTS

Figure 1:
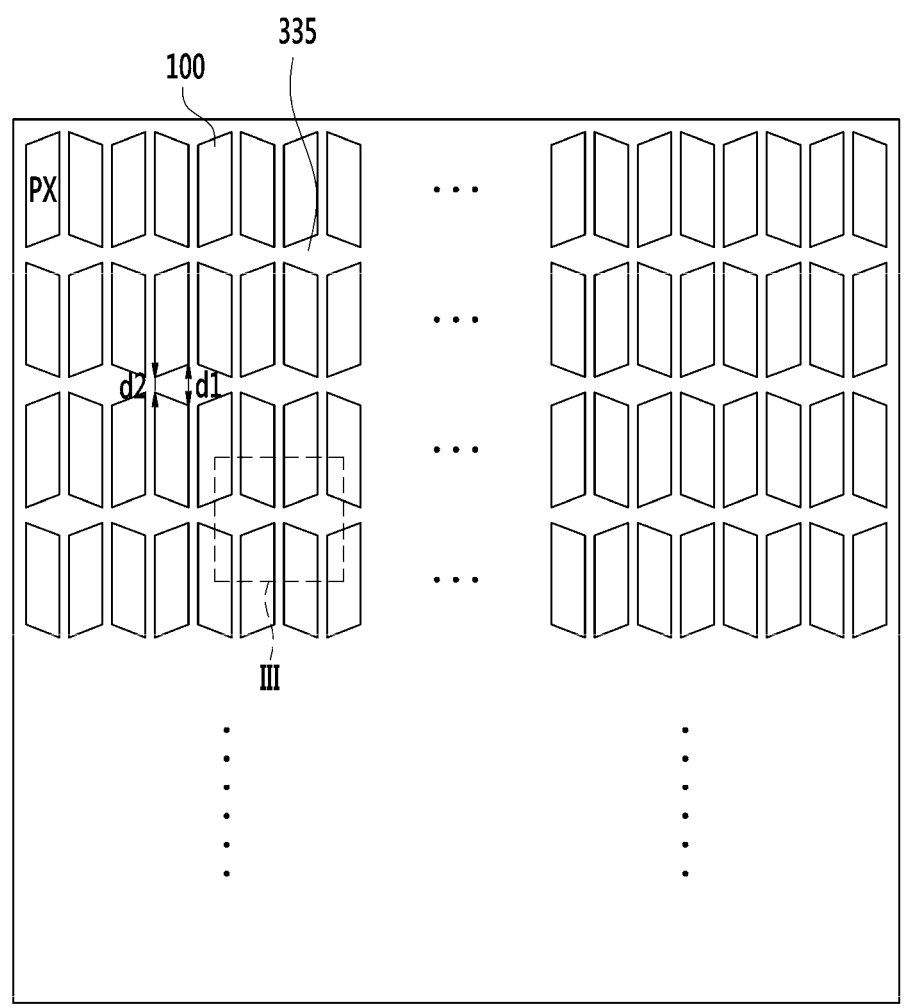
FIG. 1 is a layout view of pixels of a liquid crystal display according to an exemplary embodiment of the inventive concept.

The inventive concept will be described more fully hereinafter with reference to the accompanying drawings, in which exemplary embodiments of the inventive concept are shown. As those skilled in the art would realize, the described embodiments may be modified in various different ways, all without departing from the spirit or scope of the inventive concept.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be formed directly on the other element or intervening elements may also be present. In contrast, when an element is referred to as being "directly on" another element, there are no intervening elements present.

Generally, a liquid crystal display having an EM structure is manufactured by injecting liquid crystal through a liquid crystal injection hole formed between a plurality of microcavities after removing a sacrificial layer but liquid crystal which is not injected into the microcavity is present on a roof layer which is formed above the sacrificial layer. The liquid crystal presented on the roof layer may cause a display error.

Therefore, it is important to prevent the liquid crystal from remaining on the microcavity. A liquid display according to an exemplary embodiment of the inventive concept which may solve the above-described problems will be described in detail with reference to FIGS. 1 to 5.

Figure 2:
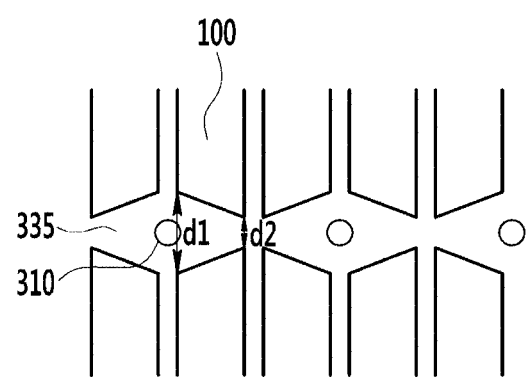
FIG. 2 is a schematic view illustrating that liquid crystal is injected into a pixel area according to an exemplary embodiment of the inventive concept.
Figure 3:
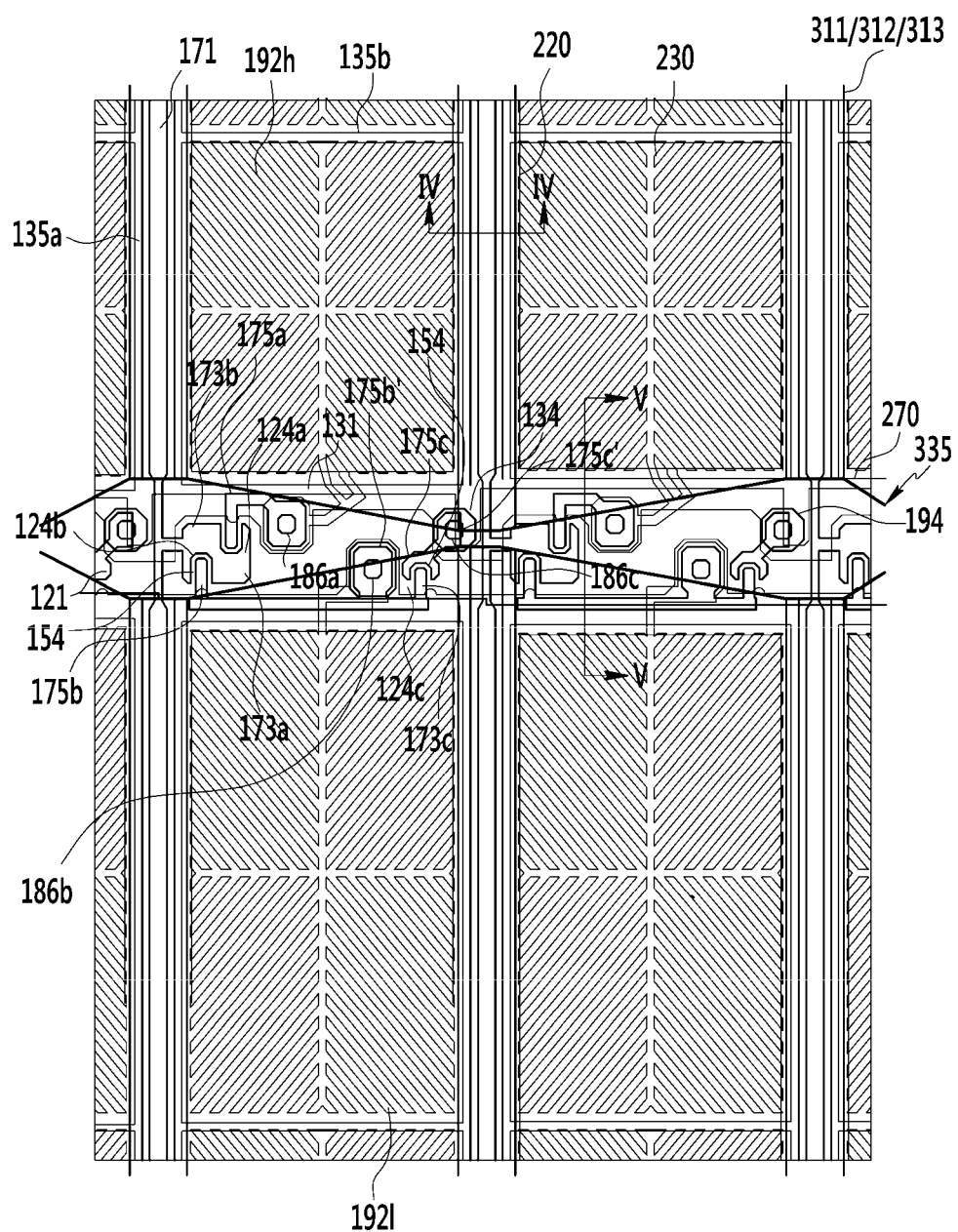
FIG. 3 is a layout view of a liquid crystal display according to an exemplary embodiment in which a region III of FIG. 1 is enlarged.
Figure 4:
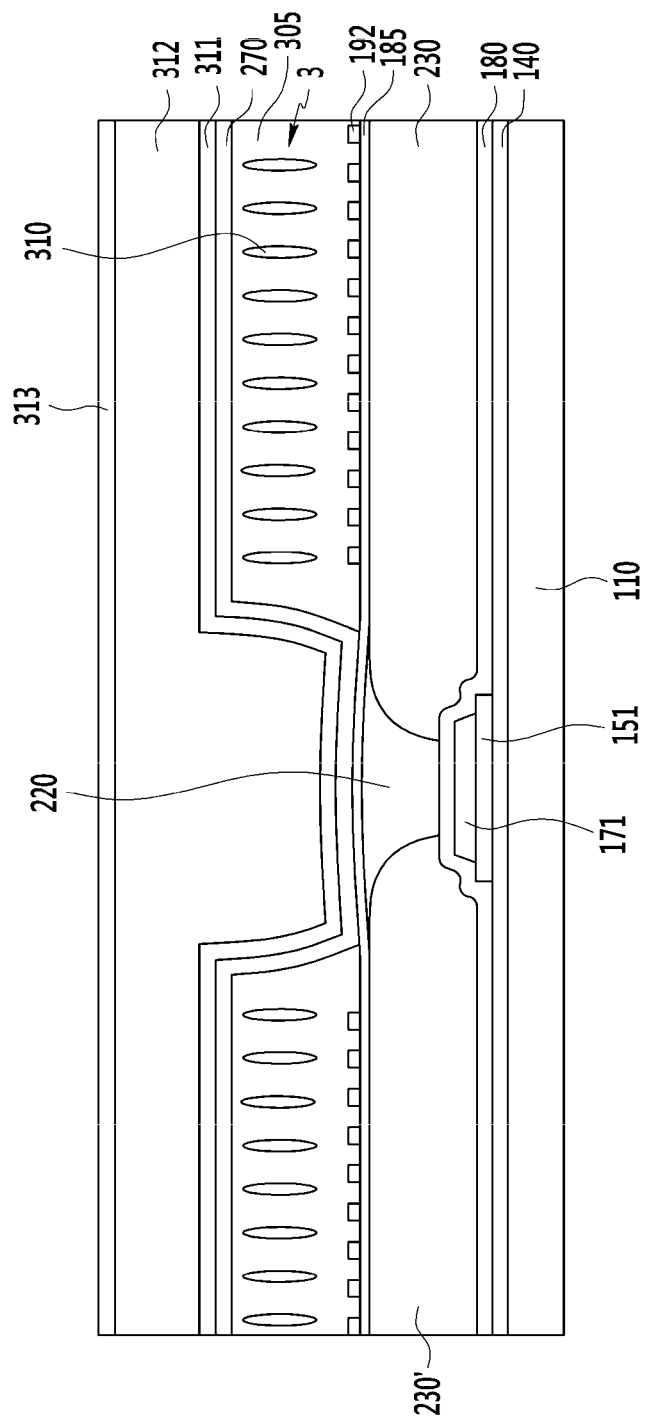
FIG. 4 is a cross-sectional view taken along the line IV-IV of FIG. 3.
Figure 5:
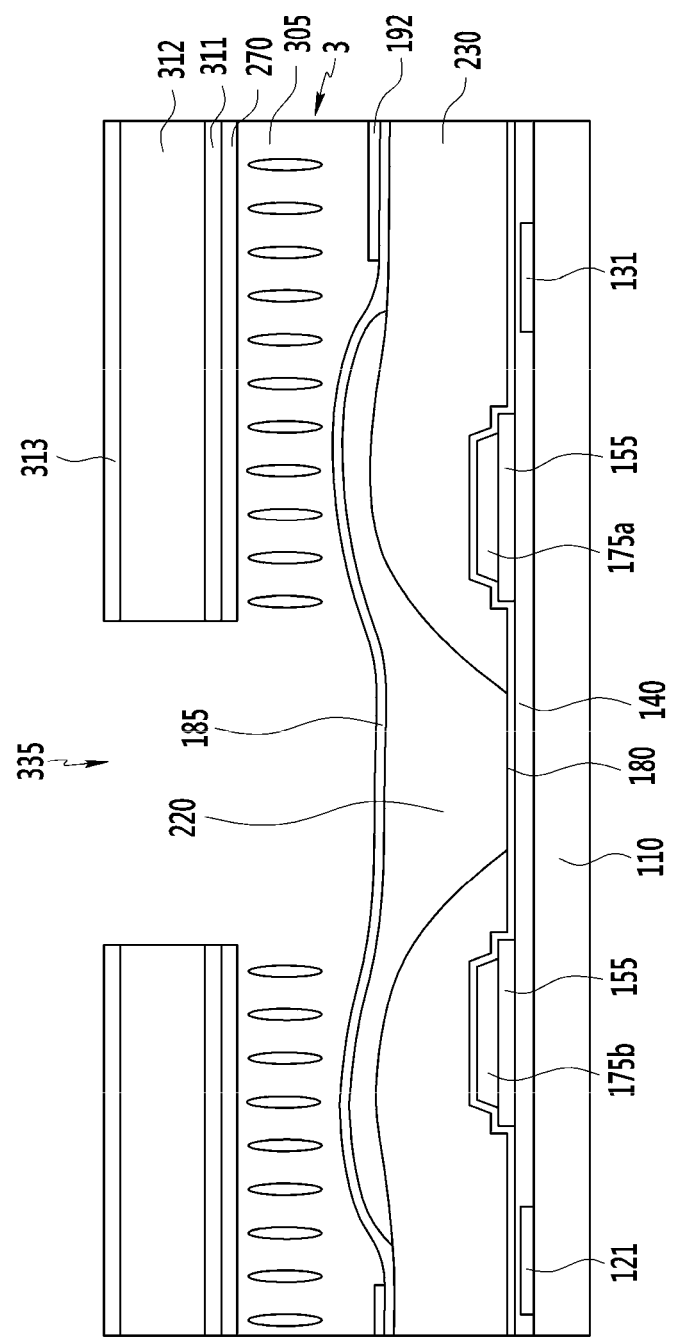
FIG. 5 is a cross-sectional view taken along the line V-V of FIG. 3.

FIG. 1 is a layout view of pixels of a liquid crystal display according to an exemplary embodiment of the inventive concept. FIG. 2 is a schematic view illustrating that liquid crystal is injected into a pixel area according to an exemplary embodiment of the inventive concept. FIG. 3 is a layout view of a liquid crystal display according to an exemplary embodiment in which a region III of FIG. 1 is enlarged. FIG. 4 is a cross-sectional view taken along the line IV-IV of FIG. 3. FIG. 5 is a cross-sectional view taken along the line V-V of FIG. 3.

First, referring to FIG. 1, a plurality of pixels of a liquid crystal display having an EM structure according to an exemplary embodiment of the inventive concept is formed to have a matrix configuration.

Opening 335 which is formed in the roof layer 312 in order to inject liquid crystal into a microcavity of the pixels 100 are formed to have a predetermined pattern, for example, trapezoidal shape connected to adjacent opening through a connecting portion. The connecting portion may have a first connecting portion connecting a wide potion and a second connecting portion connecting a narrow portion of the trapezoidal shape. The opening 335 formed between adjacent data lines (vertical direction) may have a first portion having a first width d1 and a second portion having a second width d2. Openings in adjacent pixels share a line of symmetry. A width of the opening decreases linearly from the first portion to the second portion.

The first portion having the first width d1 is wider than the second portion having the second width d2. The first portion of one opening are connected to a first portion of the adjacent opening and the second portion of one opening are connected to a second portion of the adjacent opening.

As illustrated in FIG. 2, the liquid crystal is dropped onto the portion having the first width d1.

Further, in FIG. 1, because the first portion of one opening are connected to a first portion of the adjacent opening and the second portion of one opening are connected to a second portion of the adjacent opening, portions having the first width d1 and portions having the second width d2 are repeatedly formed along a gate line direction (horizontal direction).

The liquid crystal display having the EM structure in which a width of the opening 335 is constant, when the liquid crystal is injected into the EM structure, remaining liquid crystal may present on the roof layer 312 of the pixel 100 due to a small width of the opening 335, which may cause deterioration in a display quality.

Accordingly, in order to inject the liquid crystal without remained liquid crystal on the roof layer 312, the opening 335 may be enlarged to have an enlarged portion as illustrated in FIG. 2. The opening 335 may have a first width d1 larger than the second width d2 and the liquid crystal is dropped onto the portion having the first width d1 and injected into the EM so that the liquid crystal may be prevented from remaining on the roof layer 312 of the pixel 100.

When the opening 335 has only enlarged potion having a first width d1, an area of the pixel 100 region may be reduced, so that an aperture ratio may be lowered. However, because the opening 335 has the first portion having the first width d1 and the second portion having the second width d2 narrower than the first width d1, the aperture ratio may be maintained substantially the same as the liquid crystal display having a constant width of opening.

A liquid crystal display according to an exemplary embodiment of the inventive concept will be described with reference to FIGS. 3 to 5. Referring to FIGS. 3 to 5, a gate line 121 and a sustain voltage line 131 are formed on an insulation substrate 110 which is formed of a transparent glass or plastic. The gate line 121 includes a first gate electrode 124a, a second gate electrode 124b, and a third gate electrode 124c. The sustain voltage line 131 includes storage electrodes 135a and 135b and a protrusion 134 which protrudes toward the gate line 121. The storage electrodes 135a and 135b have a structure which encloses a first sub pixel electrode 192h and a second sub pixel electrode 192l of a previous pixel. A horizontal portion 135b of the storage electrode of FIG. 3 may be a single wiring line which is not separated from a horizontal portion 135b of the previous pixel.

A gate insulating layer 140 may be formed on the gate line 121 and the sustain voltage line 131. On the gate insulating layer 140, a semiconductor 151 disposed under a data line 171, a semiconductor 155 disposed under a source/drain electrode, and a semiconductor disposed in a channel portion of a thin film transistor are formed.

A plurality of ohmic contacts may be formed on the semiconductors 151, 154, and 155 and between the data line 171 and the source/drain electrode but is not illustrated in the drawing.

A plurality of data lines 171 including a first source electrode 173a and a second source electrode 173b and data conductors 171, 173c, 175a, 175b, 175c including a first drain electrode 175a, a second drain electrode 175b, a third source electrode 173c, and a third drain electrode 175c may be formed on the semiconductors 151, 154, and 155 and the gate insulating layer 140.

A first gate electrode 124a, a first source electrode 173a, and a first drain electrode 175a form a first thin film transistor Qa together with the semiconductor 154 and a channel of the thin film transistor is formed in a portion of the semiconductor 154 between the first source electrode 173a and the first drain electrode 175a. Similarly, a second gate electrode 124b, a second source electrode 173b, and a second drain electrode 175b form a second thin film transistor Qb together with the semiconductor 154 and a channel of the thin film transistor is formed in a portion of the semiconductor 154 between the second source electrode 173b and the second drain electrode 175b and a third gate electrode 124c, a third source electrode 173c, and a third drain electrode 175c form a third thin film transistor Qc together with the semiconductor 154 and a channel of the thin film transistor is formed in a portion of the semiconductor 154 between the third source electrode 173c and the third drain electrode 175c.

The data line 171 according to an exemplary embodiment of the inventive concept has a structure which becomes narrower in a thin film transistor formation region near an expansion portion 175c' of the third drain electrode 175c. This is a structure in order to maintain an interval from an adjacent wiring line and reduce signal interference, however the data line may be formed to have a uniform width.

A first passivation layer 180 is formed on the data conductors 171, 173c, 175a, 175b, and 175c and an exposed part of the semiconductor 154. The first passivation layer 180 may include an inorganic insulator or an organic insulator such as silicon nitride (SiNx) and silicon oxide (SiOx).

A color filter 230 is formed on the passivation layer 180. Color filters 230 having the same color are formed in pixels which are adjacent to each other in a vertical direction (a data line direction). Further, color filters 230 and 230' having different colors are formed in pixels which are adjacent to each other in a horizontal direction (a gate line direction) are formed and the two color filters 230 and 230' may be superimposed to each other on the data line 171. The color filters 230 and 230' may represent any one of three primary colors such as red, green, and blue. However, the represented colors are not limited to the three primary colors of red, green, and blue but may be one of cyan, magenta, yellow, and white.

A light blocking member (black matrix) 220 is formed on the color filters 230 and 230'. The light blocking member 220 is formed on a region in which the gate line 121, the sustain voltage line 131, and the thin film transistor are formed (hereinafter, referred to as a "transistor formation region") and a region where the data line 171 is formed and is formed to have a lattice structure having an opening corresponding to a region in which an image is displayed. The color filter 230 is formed in the opening of the light blocking member 220. Further, the light blocking member 220 is formed of a material through which the light is not transmitted.

A second passivation layer 185 is formed on the color filter 230 and the light blocking member 220 to cover the color filter 230 and the light blocking member 220. The second passivation layer 185 may include an inorganic insulator or an organic insulator such as silicon nitride (SiNx) and silicon oxide (SiOx). As illustrated in the cross-sectional views of FIGS. 3 and 4, when a step portion is generated due to a difference between thicknesses of the color filter 230 and the light blocking member 220, the second passivation layer 185 may include an organic insulator to reduce or eliminate the step portion.

A first contact hole 186a and a second contact hole 186b are formed in the color filter 230, the light blocking member 220, and the passivation layers 180 and 185 to expose the first drain electrode 175a and the expansion portion 175b' of the second drain electrode 175b, respectively. Further, a third contact hole 186c is formed in the color filter 230, the light blocking member 220 and the passivation layers 180 and 185 to expose the protrusion 134 of the sustain voltage line 131 and the expansion portion 175c' of the third drain electrode 175c.

According to the present exemplary embodiment, even though the contact holes 186a, 186b, and 186c are formed in the light blocking member 220 and in the color filter 230, it may be more difficult to etch the light blocking member 220 and the color filter 230 to form the contact hole than the passivation layers 180 and 185, depending on the material used to form the light blocking member 220 and the color filter 230. Therefore, when the light blocking member 220 or color filter 230 is etched, portions of the light blocking member 220 or color filter 230 where the contact holes 186a, 186b, and 186c are formed may be removed in advance.

In the meantime, in some exemplary embodiments, a position of the light blocking member 220 is changed and only the color filter 230 and passivation layers 180 and 185 are etched to form the contact holes 186a, 186b, and 186c.

A pixel electrode 192 including the first sub pixel electrode 192h and the second sub pixel electrode 192l is formed on the second passivation layer 185. The pixel electrode 192 may be formed of a transparent conductive material such as ITO or IZO.

The first sub pixel electrode 192h and the second sub pixel electrode 192l are adjacent to each other in a column direction and an overall shape of the first sub pixel electrode 192h and the second sub pixel electrode 192l is quadrangle. The first sub pixel electrode 192h and the second sub pixel electrode 192l include a cross-shaped branch portion having a horizontal branch portion and a vertical branch portion perpendicular to the horizontal branch. Further, the first sub pixel electrode 192h and the second sub pixel electrode 192l are divided into four sub regions by the horizontal branch portion and the vertical branch portion and each sub region includes a plurality of minute branch portions.

Minute branch portions of the first sub pixel electrode 192h and the second sub pixel electrode 192l form approximately 40 degrees to 45 degrees with the gate line 121 or the horizontal branch portion. Further, the minute branch portions of two adjacent sub regions may be perpendicular to each other. Further, a width of the minute branch portion may be gradually increased or intervals between the minute branch portions may vary.

The first sub pixel electrode 192h and the second sub pixel electrode 192l are physically and electrically connected to the first drain electrode 175a and the second drain electrode 175b through the contact holes 186a and 186b and a data voltage is applied thereto from the first drain electrode 175a and the second drain electrode 175b.

In the meantime, the connecting member 194 electrically connects the expansion portion 175c' of the third drain electrode 175c to the protrusion 134 of the sustain voltage line 131 through the third contact hole 186c. As a result, a part of the data voltage which is applied to the second drain electrode 175b is divided by the third source electrode 173c so that a voltage which is applied to the second sub pixel electrode 192l may be lower than a voltage which is applied to the first sub pixel electrode 192h.

Here, an area of the second sub pixel electrode 192l may be one to twice an area of the first sub pixel electrode 192h.

In the meantime, an opening which may collect gas discharged from the color filter 230 and a cover which is formed of the same material as the pixel electrode 192 covers the opening may be formed in the second passivation layer 185. The opening and the cover are a structure which blocks the gas discharged from the color filter 230 from being transmitted to other components. The opening and the cover may be optionally provided.

A common electrode 270 is located above the second passivation layer 185, the pixel electrode 192 and on the liquid crystal layer 3 which is injected in the microcavity 305. The common electrode 270 is formed on a micro cavity corresponding to the pixel electrode 192 with an intervening liquid crystal layer 3. The common electrode 270 is also formed on a side surface of the microcavity 305 or the liquid crystal layer 3. Further, the common electrode 270 may be applied with a common voltage Vcom from the outside through a separate constituent element and adjacent common electrodes 270 may be connected to each other through the transistor formation region or a periphery of the opening 335. In this case, a part of common electrode 270 remains in the opening 335 to connect the adjacent common electrodes 270 to each other.

The common electrode 270 maintains a flat surface on the microcavity 305 because a roof layer 312, which will be described below, supports the common electrode.

The common electrode 270 is formed of the transparent conductive material such as ITO or IZO and generates an electric field together with the pixel electrode 192 to control an orientation of the liquid crystal molecule 310.

A lower insulating layer 311 is disposed on the common electrode 270 and the second passivation layer 185 and at the side of the liquid crystal layer 3 or a side surface of the microcavity 305. The lower insulating layer 311 may have an opening 335 at one side so as to inject the liquid crystal into the microcavity 305. The lower insulating layer 311 may include an inorganic insulating material such as silicon nitride (SiNx). The opening 335 may be also used to remove the sacrificial layer for forming the microcavity 305. This will be described in detail in a description of a manufacturing method.

Further, in order to arrange the liquid crystal molecules which are injected in the microcavity 305, an alignment layer (not illustrated) may be formed in the microcavity 305. The alignment layer may be formed of at least one of materials, which are generally used as a liquid crystal alignment layer, such as polyamic acid, polysiloxane and polyimide.

The liquid crystal layer 3 is formed in the microcavity 305 (specifically, inside the alignment layer). The liquid crystal molecules 310 are initially arranged by the alignment layer and the orientation of the liquid crystal molecules 310 is altered in accordance with an applied electric field. A height of the liquid crystal layer 3 corresponds to a height of the microcavity 305. The liquid crystal layer 3 which is disposed in the microcavity 305 may be also referred to as nano crystal.

The liquid crystal layer 3 which is formed in the microcavity 305 may be injected into the microcavity 305 using a capillary force and the alignment layer may be also formed by the capillary force.

The roof layer 312 is formed on the lower insulating layer 311. The roof layer 312 is formed to support a space (microcavity) between the pixel electrode 192 and the common electrode 270. Thus the nano liquid crystal may be formed in the space. The roof layer 312 according to the present exemplary embodiment serves to support the microcavity 305 with a predetermined thickness above the common electrode 270 and may have an opening 335 at one side thereof to inject the liquid crystal into the microcavity 305.

The opening 335 which is formed in the roof layer 312 in order to inject the liquid crystal into the microcavity 305 of the pixel 100 is formed to have a predetermined pattern. The opening 335 formed between adjacent data lines (vertical direction) may have a first portion having a first width d1 and a second portion having a second width d2.

The portion having the first width d1 is wider than the portion having the second width d2. The first portion of one opening are connected to a first portion of the adjacent opening and the second portion of one opening are connected to a second portion of the adjacent opening. Thus, adjacent two openings may form a diamond shape.

In the opening 335 according to the exemplary embodiment of the inventive concept, because the first portion of one opening are connected to a first portion of the adjacent opening and the second portion of one opening are connected to a second portion of the adjacent opening, portions having the first width d1 and a portion having the second width d2 are repeated, as illustrated in FIG. 2. The liquid crystal is directly dropped onto the portion having the first width d1. The dropped liquid crystal is injected into the microcavity 305.

Further, in the opening 335 according to the exemplary embodiment of the inventive concept, because the first portion of one opening are connected to a first portion of the adjacent opening and the second portion of one opening are connected to a second portion of the adjacent opening, portions having the first width d1 and portions having the second width d2 are repeatedly formed along a gate line direction (horizontal direction).

The liquid crystal display having the EM structure in which a width of the opening 335 is uniform, when the liquid crystal is injected into the microcavity 305, remaining liquid crystal may present on the roof layer 312 of the pixel 100 due to a small width of the opening 335, which may cause deterioration in a display quality.

Accordingly, in order to inject the liquid crystal without remained liquid crystal on the roof layer 312, the opening 335 may be enlarged to have an enlarged portion as illustrated in FIG. 2. The opening 335 may have a first width d1 larger than the second width d2 and the liquid crystal is dropped onto the portion having the first width d1 and injected into the microcavity so that the liquid crystal may be prevented from remaining on the roof layer 312 of the pixel 100.

When the opening 335 has only enlarged potion having a first width d1, an area of the pixel 100 region may be reduced, so that an aperture ratio may be lowered. However, because the opening 335 has the first portion having the first width d1 and the second portion having the second width d2 narrower than the first width d1, the aperture ratio may be maintained substantially the same as the liquid crystal display having a uniform width of opening.

An upper insulating layer 313 is formed on the roof layer 312. The upper insulating layer 313 may include an inorganic insulating material such as silicon nitride (SiNx). The roof layer 312 and the upper insulating layer 313 are patterned together with the lower insulating layer 311 to form an opening 335.

In some exemplary embodiments, the lower insulating layer 311 and the upper insulating layer 313 may be omitted.

A capping layer (not illustrated) is formed on the upper insulating layer 313 to block the liquid crystal molecule 310 from being leaked to the outside through the opening 335.

A polarizer (not illustrated) is disposed above the lower and upper insulating layer 313 (or above the capping layer) of the insulation substrate 110. The polarizer may include a polarizing element which generates polarization and a tri-acetyl-cellulose (TAC) layer which ensures durability. In some exemplary embodiments, transmissive axes of an upper polarizer and a lower polarizer may be perpendicular or horizontal to each other.

Now, a liquid crystal display according to another exemplary embodiment of the inventive concept will be described in detail with reference to FIG. 6.

Figure 6:
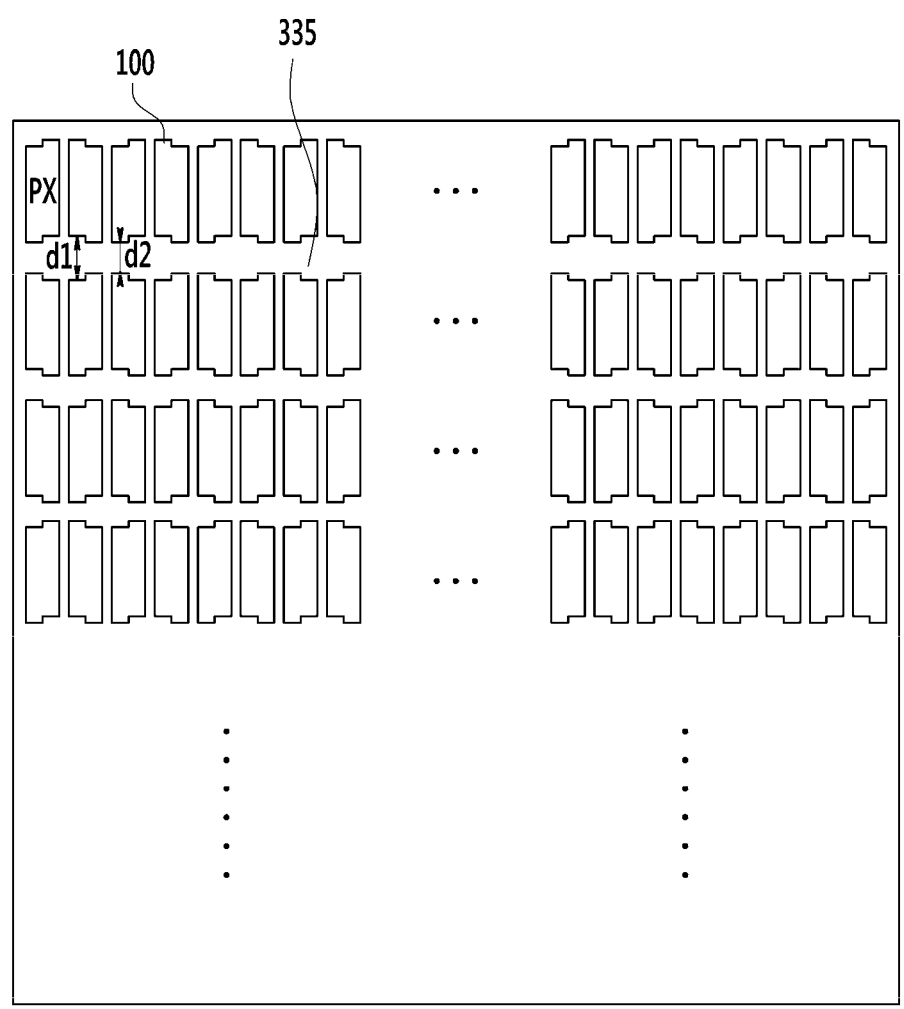
FIG. 6 is a layout view of pixels of a liquid crystal display according to another exemplary embodiment of the inventive concept.

FIG. 6 is a layout view of pixels of a liquid crystal display according to another exemplary embodiment of the inventive concept.

Another exemplary embodiment of the inventive concept illustrated in FIG. 6 is substantially same as the exemplary embodiment illustrated in FIG. 1 except a configuration of the pixel 100 and a configuration of the opening 335 so that redundant description will be omitted.

As illustrated in FIG. 6, an opening 335 of a liquid crystal display according to another exemplary embodiment of the inventive concept may have a first portion having a first width d1 and a second portion having a second width d2. Openings in adjacent pixels share a line of symmetry. The portion having the first width d1 is wider than the portion having the second width d2. One pixel has two first portions and two second portions. The two first portions are disposed in a diagonal direction. The two second portions are disposed in a diagonal direction. The first portions in adjacent pixels in a low direction and in a column direction are adjacent each other. The second portions in adjacent pixels in a low direction and in a column direction are adjacent to and opposite to each other. Thus adjacent four pixels (2 rows by 2 columns) form a large opening area on which liquid crystal may be dropped. A line connecting large openings in a row direction and a line connecting large openings in a column direction meet at acute angle. The opening 335 of the liquid crystal display according to another exemplary embodiment of the inventive concept illustrated in FIG. 6 may be formed to occupy a predetermined region, which is different from the opening illustrated in FIG. 1.

A liquid crystal display according to still another exemplary embodiment of the inventive concept will be described in detail with reference to FIG. 7.

Figure 7:
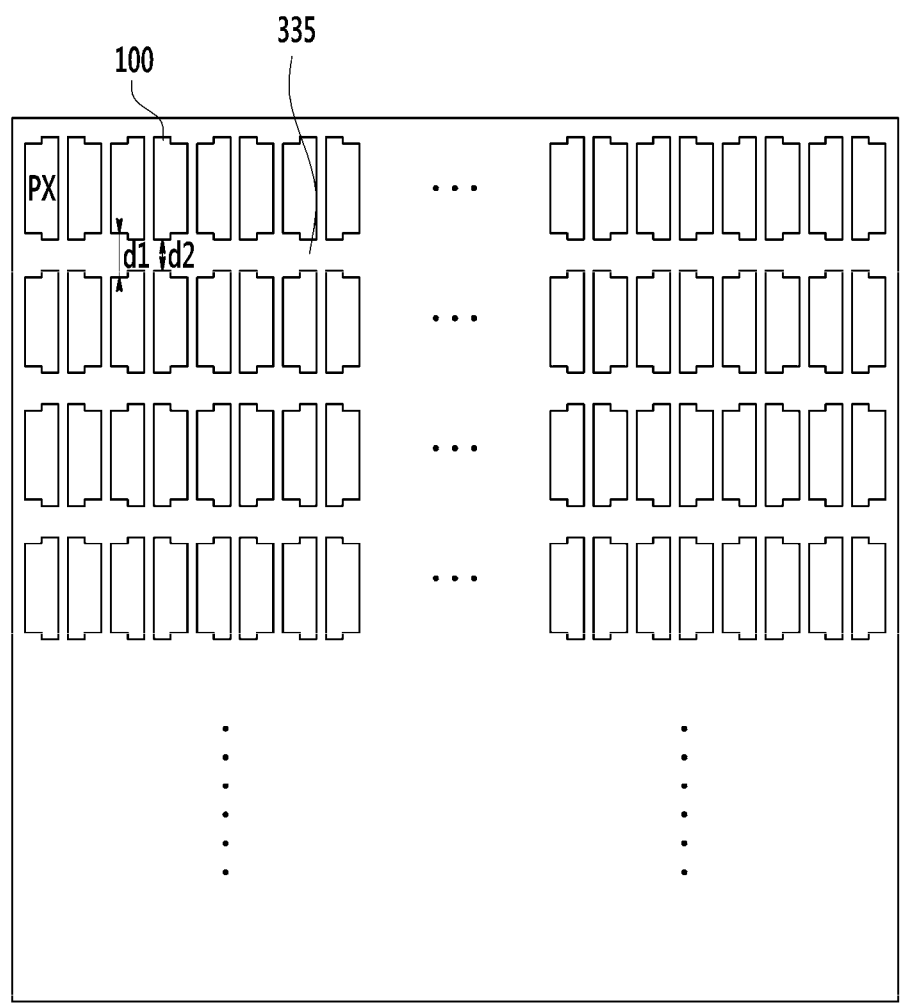
FIG. 7 is a layout view of pixels of a liquid crystal display according to still another exemplary embodiment of the inventive concept.

FIG. 7 is a layout view of pixels of a liquid crystal display according to still another exemplary embodiment of the inventive concept.

Another exemplary embodiment of the inventive concept illustrated in FIG. 7 is substantially same as the exemplary embodiment illustrated in FIG. 6 except positions of the portion having the first width d1 and the portion having the second width d2 so that redundant description will be omitted.

As illustrated in FIG. 7, the pixel may have first portions having a first width d1 and second portions having a second width d2. The first width d1 is wider than the second width d2. One pixel has two first portions and two second portions. Openings in adjacent pixels share a line of symmetry. The two first portions are disposed in a same side of the pixel and the two second portions are disposed in a same side of the pixel. The first portions in adjacent pixels in a low direction and in a column direction are adjacent each other. The second portions in adjacent pixels in a low direction and in a column direction are adjacent each other. Thus adjacent four pixels (2 rows by 2 columns) form a large opening area on which liquid crystal may be dropped. A line connecting large openings in a row direction and a line connecting large openings in a column direction meet substantially at right angle.

A liquid crystal display according to still another exemplary embodiment of the inventive concept will be described in detail with reference to FIG. 8.

Figure 8:
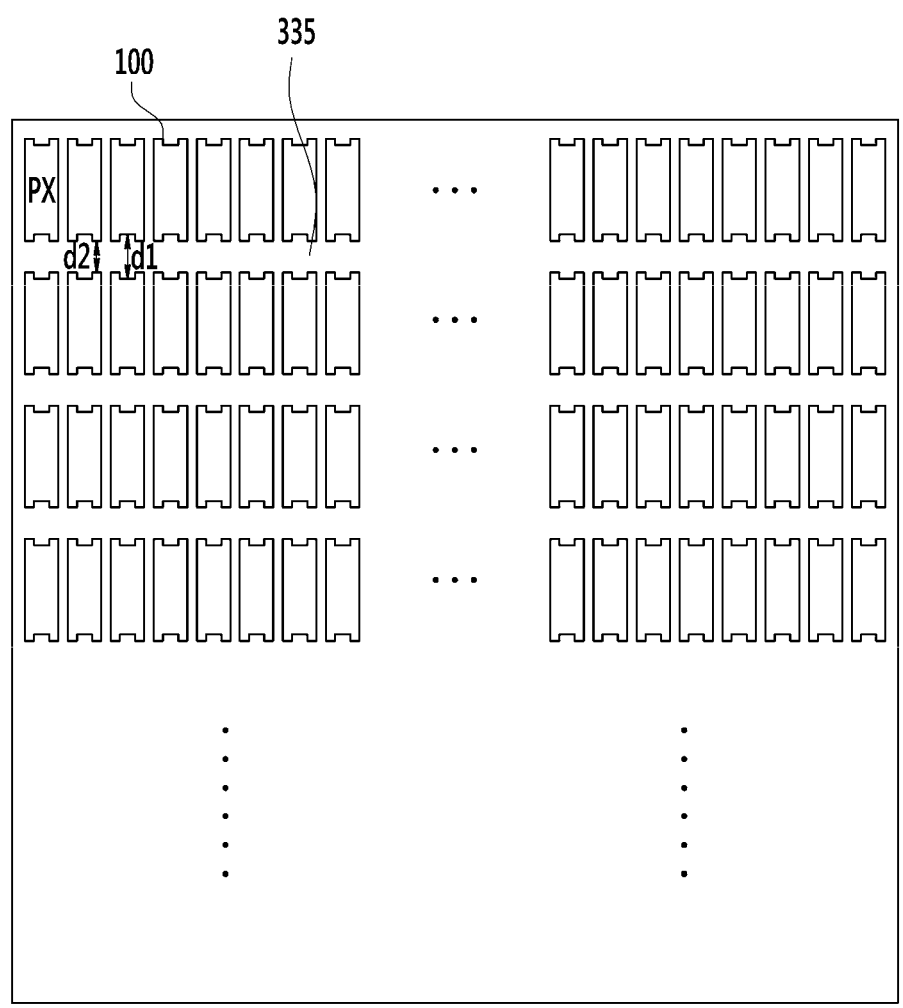
FIG. 8 is a layout view of pixels of a liquid crystal display according to still another exemplary embodiment of the inventive concept.

FIG. 8 is a layout view of pixels of a liquid crystal display according to still another exemplary embodiment of the inventive concept.

Another exemplary embodiment of the inventive concept illustrated in FIG. 8 is substantially same as the exemplary embodiment illustrated in FIG. 6 except a configuration of the pixel 100 and a configuration of the opening 335 so that redundant description will be omitted.

As illustrated in FIG. 8, an opening 335 of a liquid crystal display according to another exemplary embodiment of the inventive concept may have a first portion having a first width d1 and a second portion having a second width d2. The first portion is disposed on a center of a pixel in a row direction and the second portion is disposed on both side of the first portion. The first portion and the second portion of the opening in one row of pixel face the first portion and the second portion of the adjacent pixel row respectively. Openings in adjacent pixels share a line of symmetry.

Hereinafter, a manufacturing method of a liquid crystal display according to an exemplary embodiment of the inventive concept will be described with reference to FIGS. 9 to 19.

FIGS. 9 to 19 are views sequentially illustrating a manufacturing method of a liquid crystal display according to an exemplary embodiment of the inventive concept.

Figure 9:
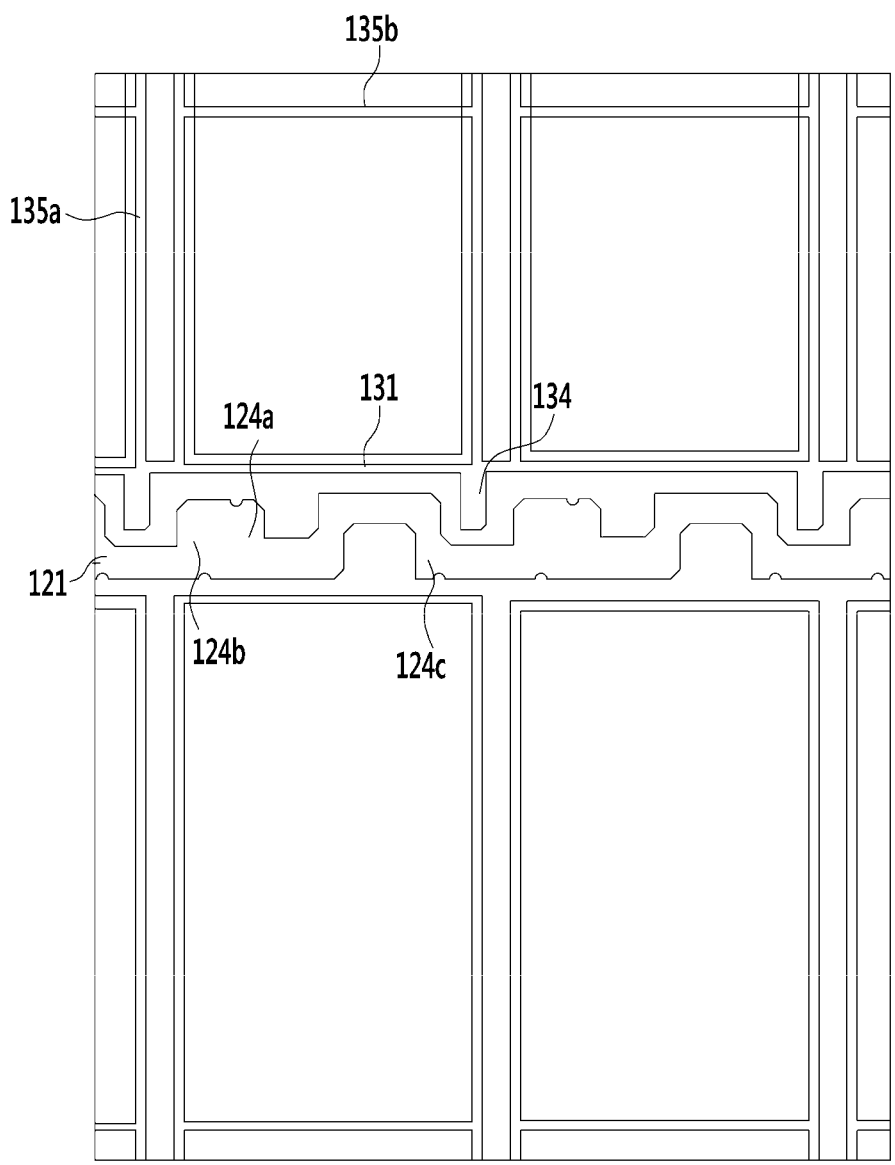

First, FIG. 9 is a layout view in which a gate line 121 and a sustain voltage line 131 are formed on an insulation substrate 110.

Referring to FIG. 9, a gate line 121 and a sustain voltage line 131 are formed on an insulation substrate 110 which is formed of transparent glass or plastic. The gate line 121 and the sustain voltage line 131 may be formed of the same material by the same mask. Further, the gate line 121 includes a first gate electrode 124a, a second gate electrode 124b, and a third gate electrode 124c and the sustain voltage line 131 includes storage electrodes 135a and 135b and a protrusion 134 which protrudes toward the gate line 121. The storage electrodes 135a and 135b have a structure which encloses a first sub pixel electrode 192h and a second sub pixel electrode 192l of a previous pixel. A gate voltage is applied to the gate line 121 and a sustain voltage is applied to the sustain voltage line 131 so that the gate line 121 and the sustain voltage line 131 are formed so as to be spaced apart from each other. The sustain voltage may have a constant voltage level or a swinging voltage level.

A gate insulating layer 140 is formed on the gate line 121 and the sustain voltage line 131 so as to cover the gate line 121 and the sustain voltage line 131.

Figure 10:
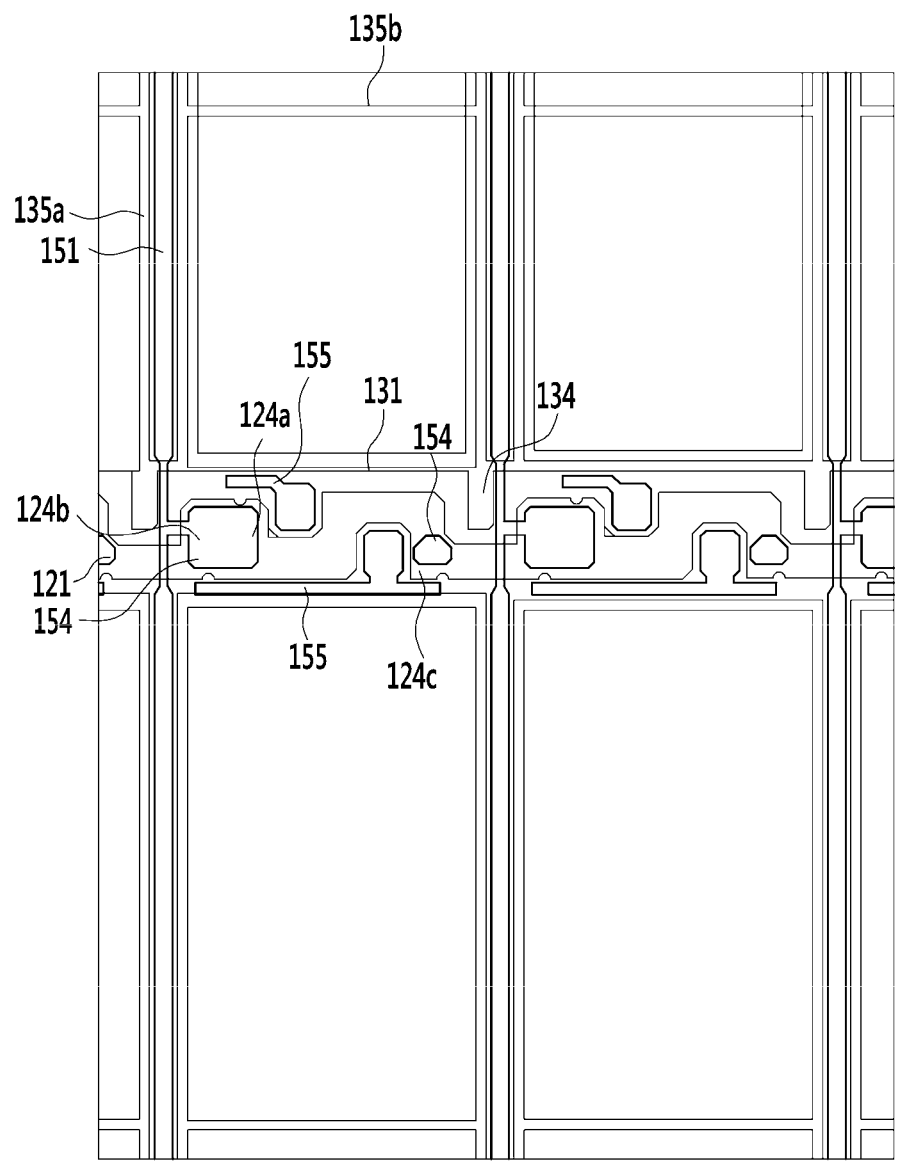
Figure 11:
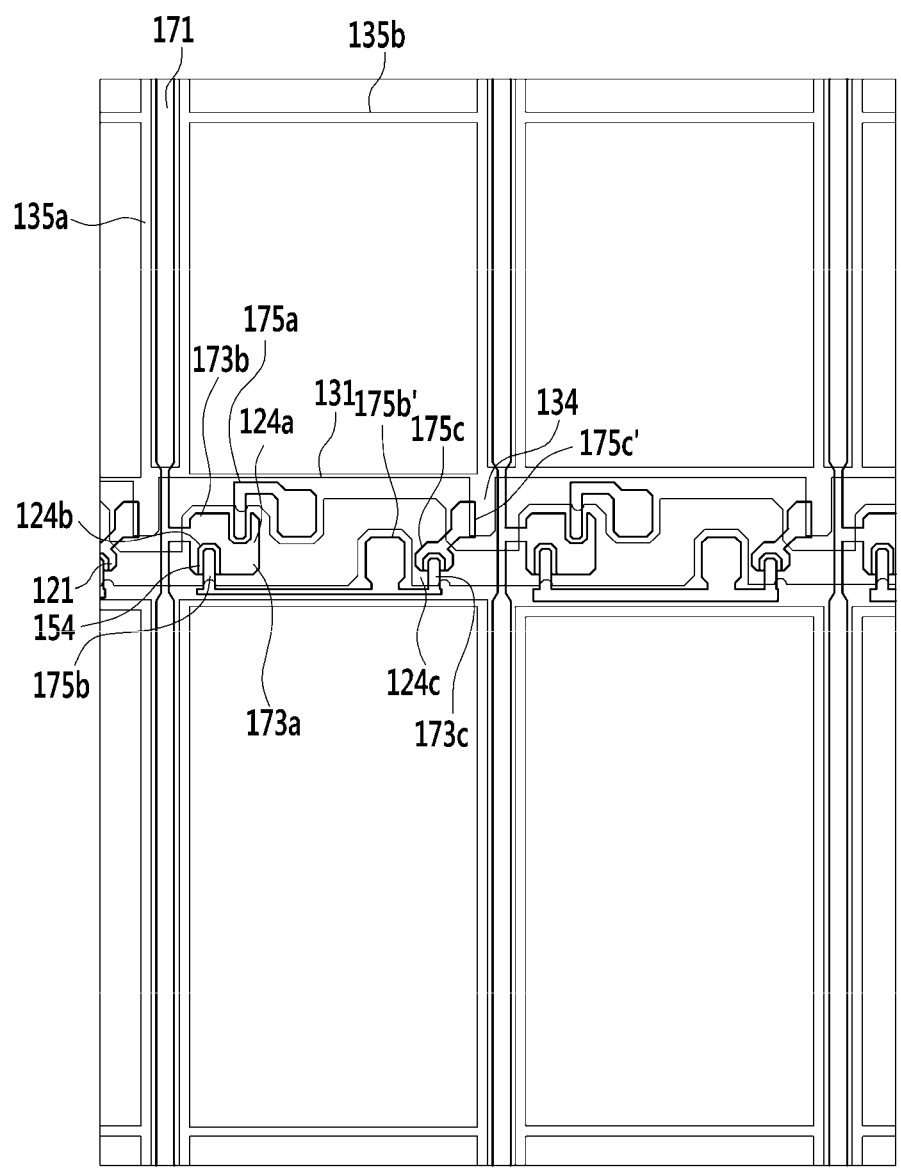

Thereafter, as illustrated in FIGS. 10 and 11, semiconductors 151, 154, and 155, a data line 171, and source/drain electrodes 173a, 173b, 173c, 175a, 175b, and 175c are formed on the gate insulating layer 140.

FIG. 10 illustrates a layout view in which the semiconductors 151, 154, and 155 are formed and FIG. 11 illustrates a layout view in which the data line 171 and the source/drain electrodes 173a, 173b, 173c, 175a, 175b, and 175c are formed. The semiconductors 151, 154, and 155, the data line 171 and the source/drain electrodes 173a, 173b, 173c, 175a, 175b, and 175c may be formed together by processes as described below.

That is, a material for forming the semiconductor and materials for forming the data line and the source/drain electrode are sequentially laminated. Thereafter, one process of exposing, developing, and etching using one mask (a slit mask or a transflective mask) is performed to form two patterns together. In this case, so as not to etch the semiconductor 154 which is disposed in a channel portion of the thin film transistor, the corresponding portion is exposed through a slit or a transflective region of the mask.

In this case, a plurality of ohmic contacts may be formed on the semiconductors 151, 154, and 155 and between the data line 171 and the source/drain electrode.

A first passivation layer 180 is formed over an entire region of data conductors 171, 173c, 175a, 175b, and 175c and an exposed portion of the semiconductor 154. The first passivation layer 180 may include an inorganic insulator or an organic insulator such as silicon nitride (SiNx) and silicon oxide (SiOx).

Figure 12A:
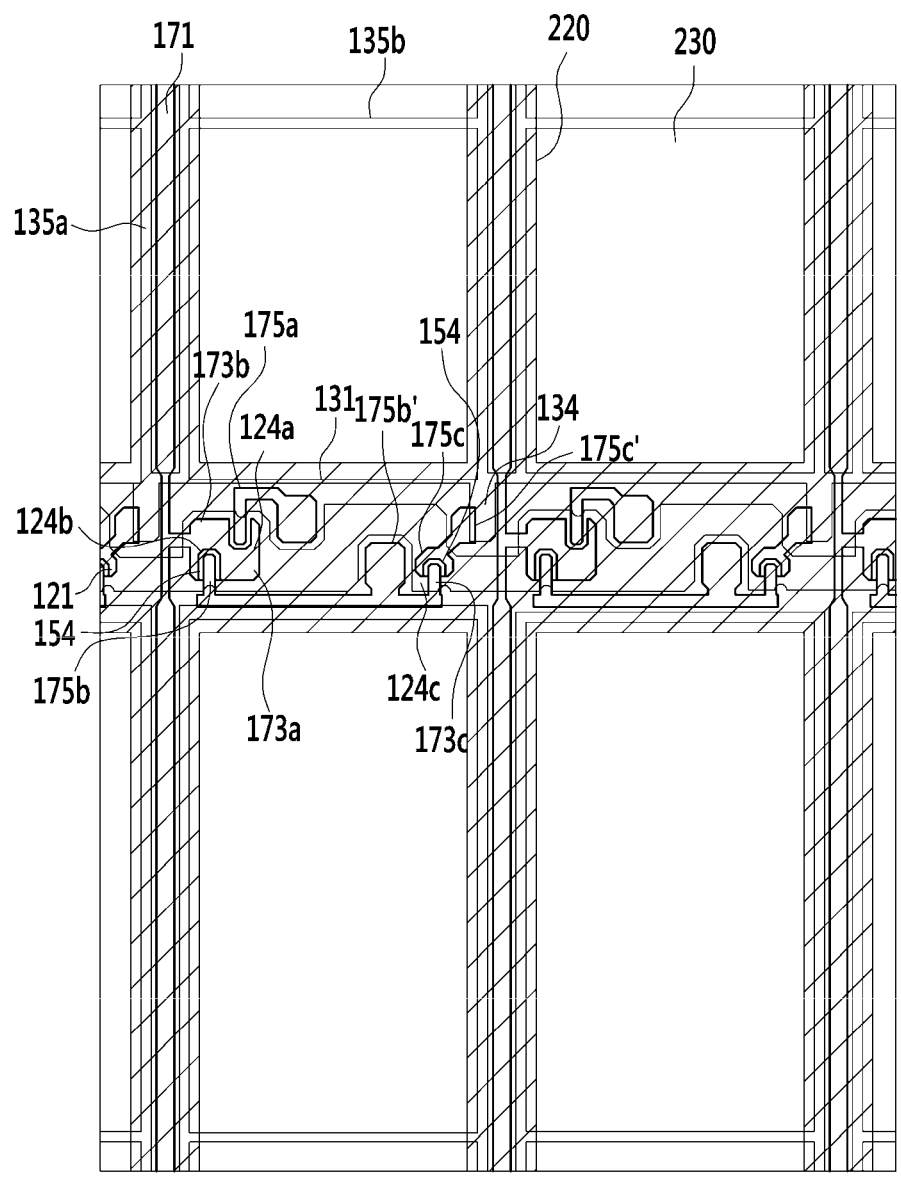

Thereafter, as illustrated in FIGS. 12A and 12B, a color filter 230 and a light blocking member (black matrix) 220 are formed on the first passivation layer 180. Here, FIG. 12A is a layout view corresponding to FIG. 3, FIG. 12B is a cross-sectional view corresponding to FIG. 4 and FIG. 12B illustrates the color filter 230 and the light blocking member 220 formed after exposure and etching.

When the color filter 230 and the light blocking member 220 are formed, the color filter 230 is formed first. A color filter 230 having one color is longitudinally formed in a vertical direction (data line direction) and color filters 220 and 230' having different colors are formed in pixels which are adjacent in a horizontal direction (gate line direction). As a result, the exposure, development, and etching process needs to be performed for every color filter 230 having different colors. In the case of the liquid crystal display including three primary colors, the color filter 230 is formed by performing the exposure, development, and etching process three times. In this case, on the data line 171, a color filter 230' which is formed earlier is disposed in a lower portion and a color filter 230 which is formed later is formed in an upper portion to be superimposed to each other.

When the color filter 230 is removed, portions of the color filter 230 where the contact holes 186a, 186b, and 186c are formed may be removed in advance.

A light blocking member 220 which is formed of a material through which the light does not transmit is formed on the color filter 230. Referring to a portion represented by hatched portion in FIG. 12A (indicating the light blocking member 220), the light blocking member 220 is formed to have a lattice structure having an opening corresponding to a region in which an image is displayed. The color filter 230 is formed in the opening.

The light blocking member 220, as illustrated in FIG. 12A, has a portion formed in a horizontal direction along a transistor formation region where the gate line 121, the sustain voltage line 131, and the thin film transistor are formed and a portion formed in a vertical direction with respect to a region where the data line 171 is formed.

Figure 13A:
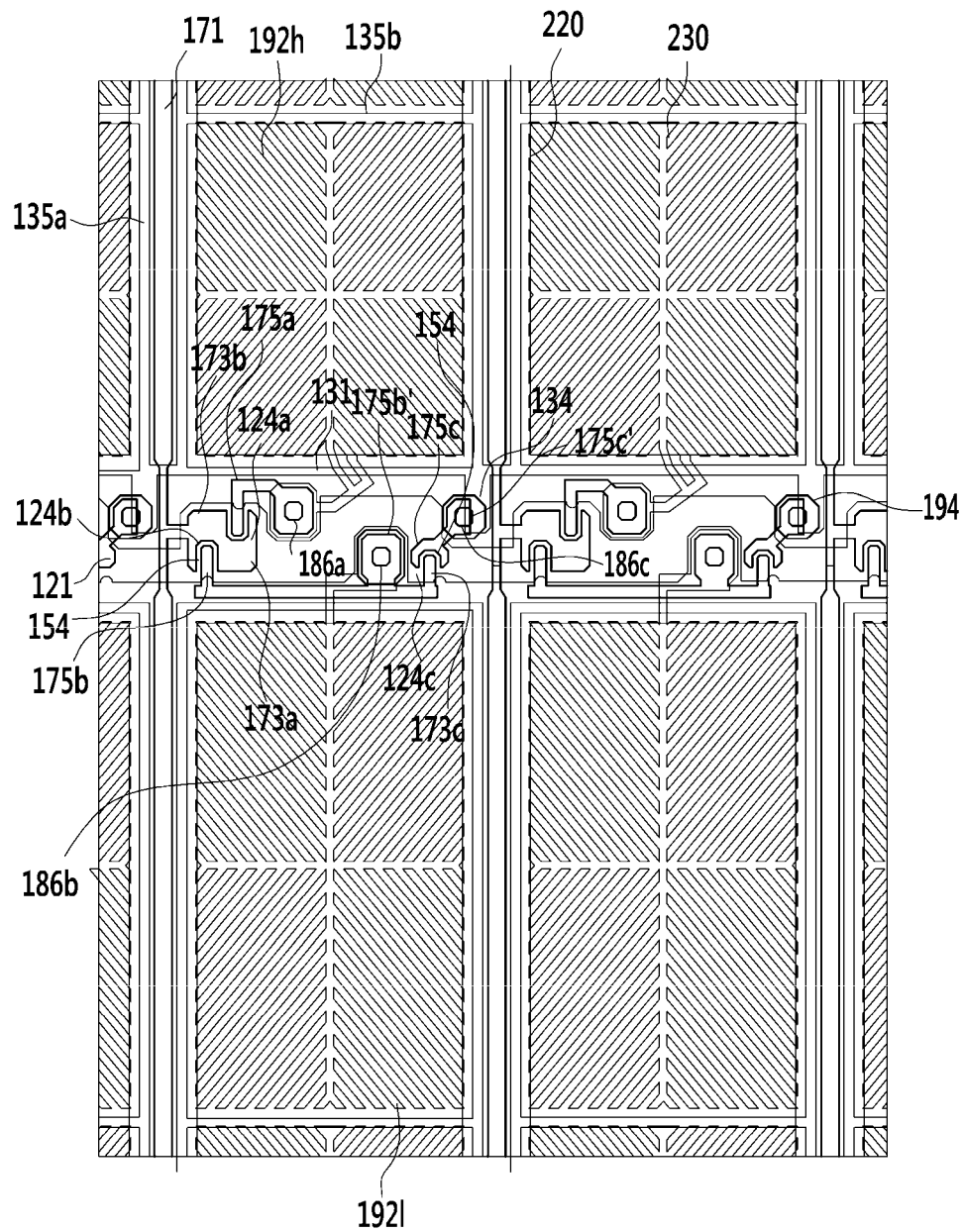
Figure 13B:
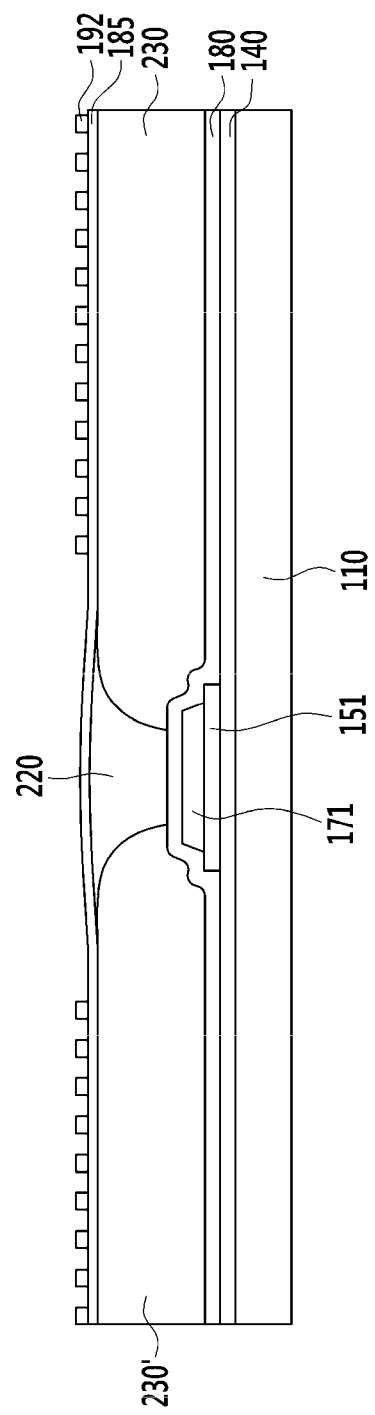

Referring to FIGS. 13A and 13B, a second passivation layer 185 is formed above an entire region of the color filter 230 and the light blocking member 220. The second passivation layer 185 may include an inorganic insulator or an organic insulator such as silicon nitride (SiNx) and silicon oxide (SiOx).

Thereafter, a first contact hole 186a and a second contact hole 186b are formed in the color filter 230, the light blocking member 220, and the passivation layers 180 and 185 so as to expose the first drain electrode 175a and the expansion portion 175b' of the second drain electrode 175b. Further, a third contact hole 186c is formed in the color filter 230, the light blocking member 220, and the passivation layers 180 and 185 so as to expose the protrusion 134 of the sustain voltage line 131 and the expansion portion 175c' of the third drain electrode 175c.

Next, a pixel electrode 192 including a first sub pixel electrode 192h and a second sub pixel electrode 192l is formed on the second passivation layer 185. In this case, the pixel electrode 192 may be formed of a transparent conductive material such as ITO or IZO. Further, the first sub pixel electrode 192h and the second sub pixel electrode 192l are physically and electrically connected to the first drain electrode 175a and the second drain electrode 175b through the contact holes 186a and 186b. Further, a connecting member 194 which electrically connects the expansion portion 175c' of the third drain electrode 175c to the protrusion 134 of the sustain voltage line 131 through the third contact hole 186c is formed. As a result, a part of the data voltage which is applied to the second drain electrode 175b is divided by the third source electrode 173c so that a voltage which is applied to the second sub pixel electrode 192l may be lower than a voltage which is applied to the first sub pixel electrode 192h.

Here, FIG. 13B is a view corresponding to FIG. 4 and illustrates a cross-sectional view of a liquid crystal display which has been formed as illustrated in to FIG. 13A.

Figure 14A:
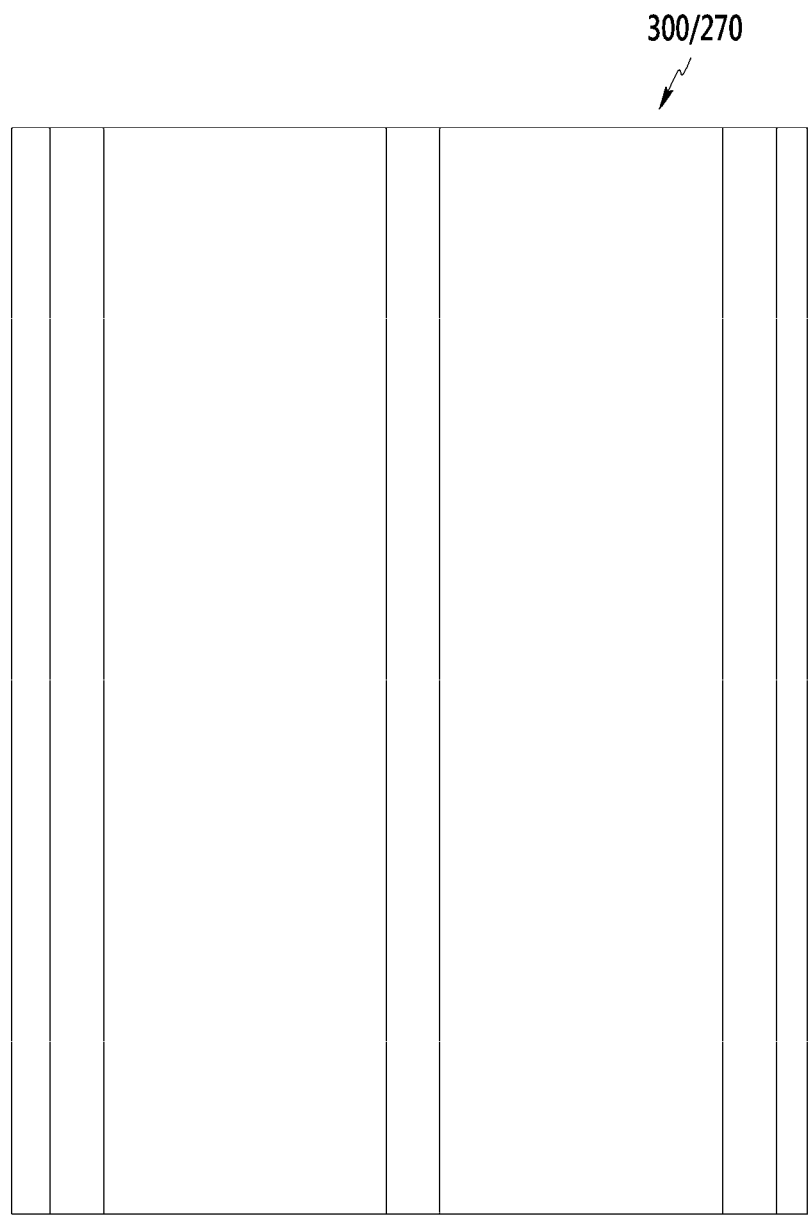
Figure 14B:
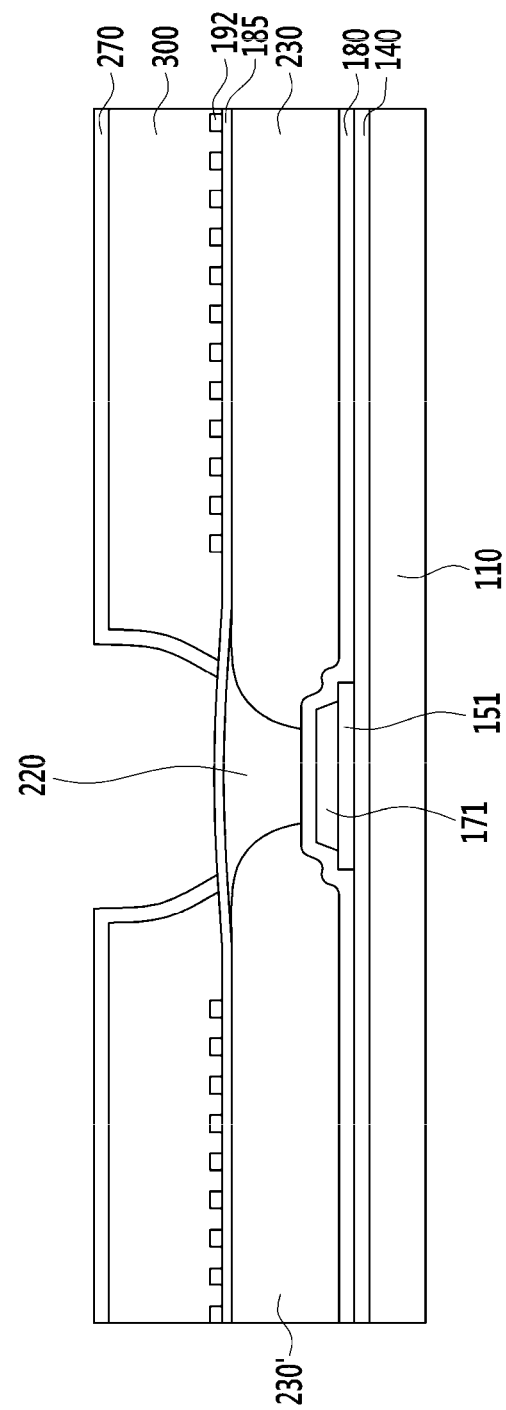
Figure 14C:
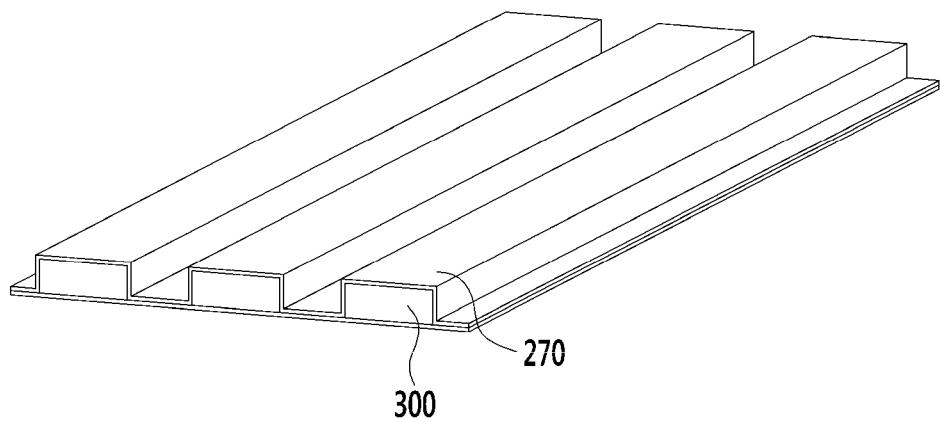

Thereafter, a sacrificial layer 300 and a common electrode 270 are formed as illustrated in FIG. 14C. The sacrificial layer 300 and the common electrode 270 as illustrated in FIG. 14C are manufactured as follows.

As illustrated in FIGS. 14A to 14C, a photo resist PR is laminated on an entire liquid crystal panel on which the second passivation layer 185 and the pixel electrode 192 are formed to form a sacrificial layer 300. Sacrificial layers 300 which are separately formed for every pixel 100 are formed by the exposure and development process.

The sacrificial layer 300 may be removed in a position corresponding to a position on the second passivation layer 185 where the light blocking member 220 is formed.

Thereafter, a transparent conductive material such as ITO or IZO is laminated on the entire insulation substrate 110 which is a portion corresponding to a position on the sacrificial layer 300 and the second passivation layer 185 where the light blocking member 220 is formed to form a common electrode 270.

As a result, a linear pattern of the sacrificial layer 300 and the common electrode 270 is completed as illustrated in FIG. 14C.

Figure 15A:
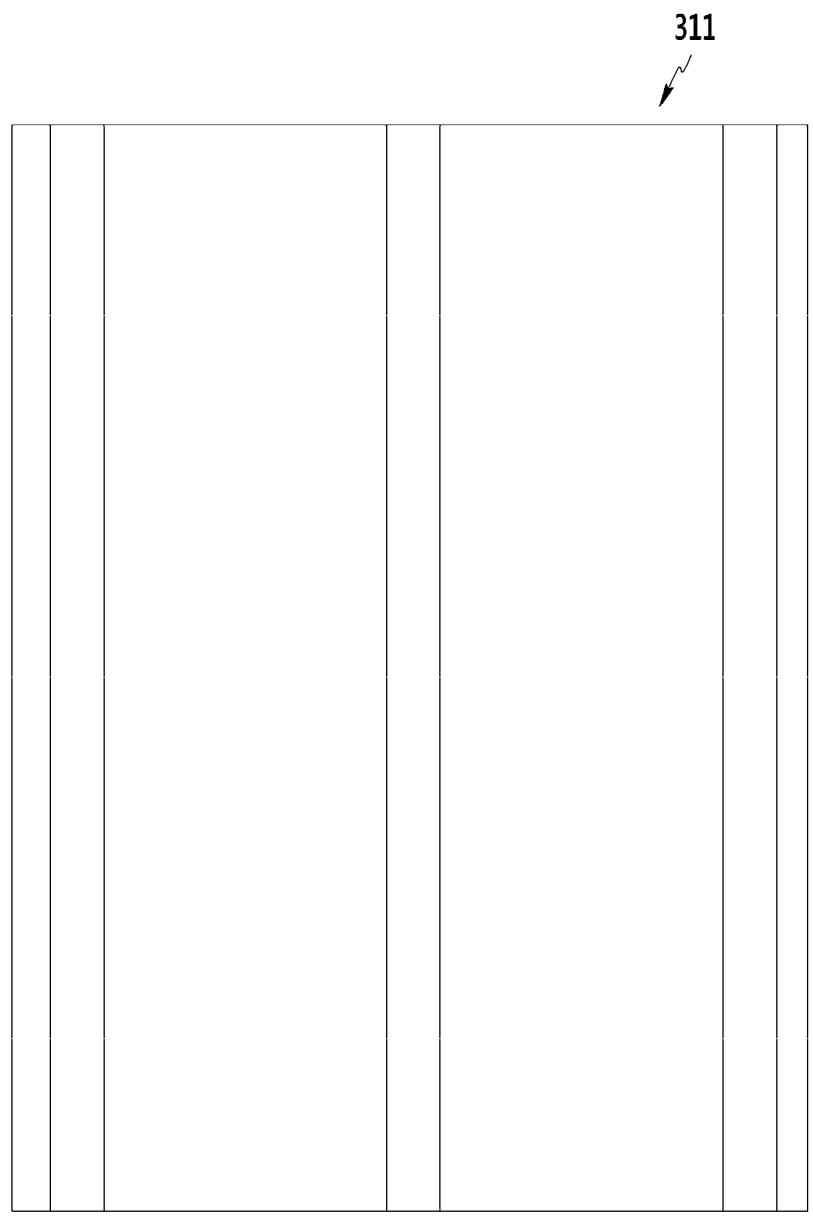
Figure 15B:
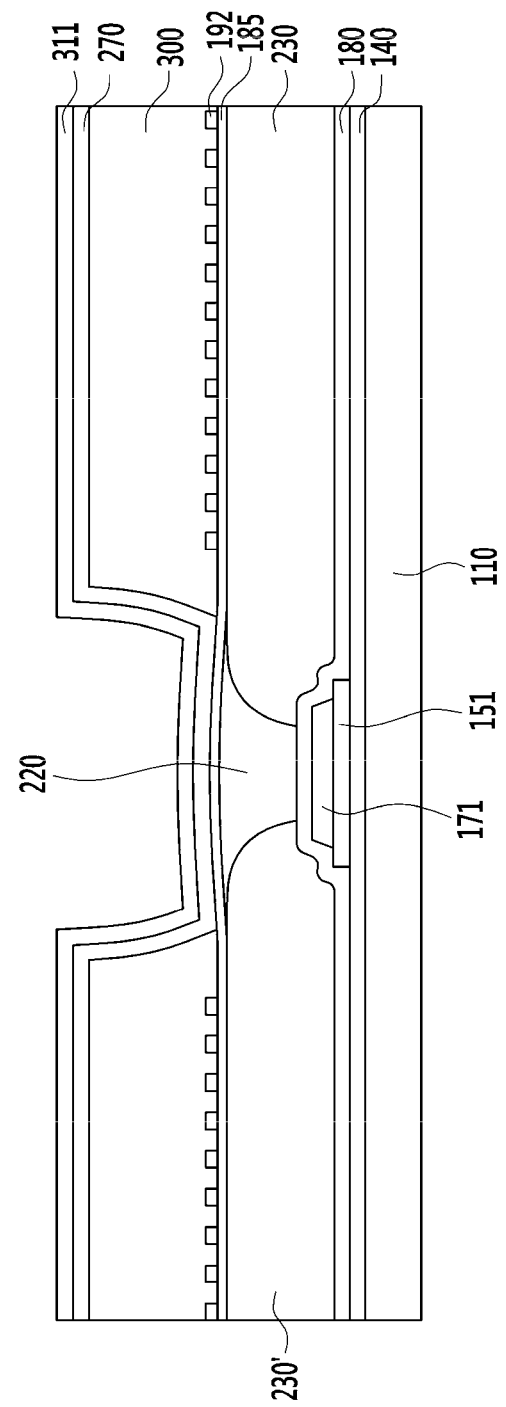
Figure 15C:
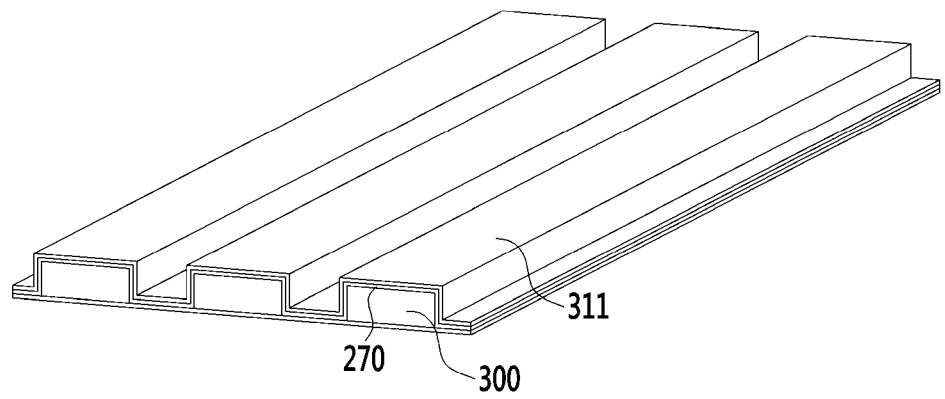

Next, as illustrated in FIGS. 15A to 15C, a lower insulating layer 311 including an inorganic insulating material such as silicon nitride (SiNx) is formed on entire liquid crystal panel on which the linear pattern of the sacrificial layer 300 and the common electrode 270 is formed. The lower insulating layer 311 covers the linear pattern of the sacrificial layer 300 and the common electrode 270.

Figure 16A:
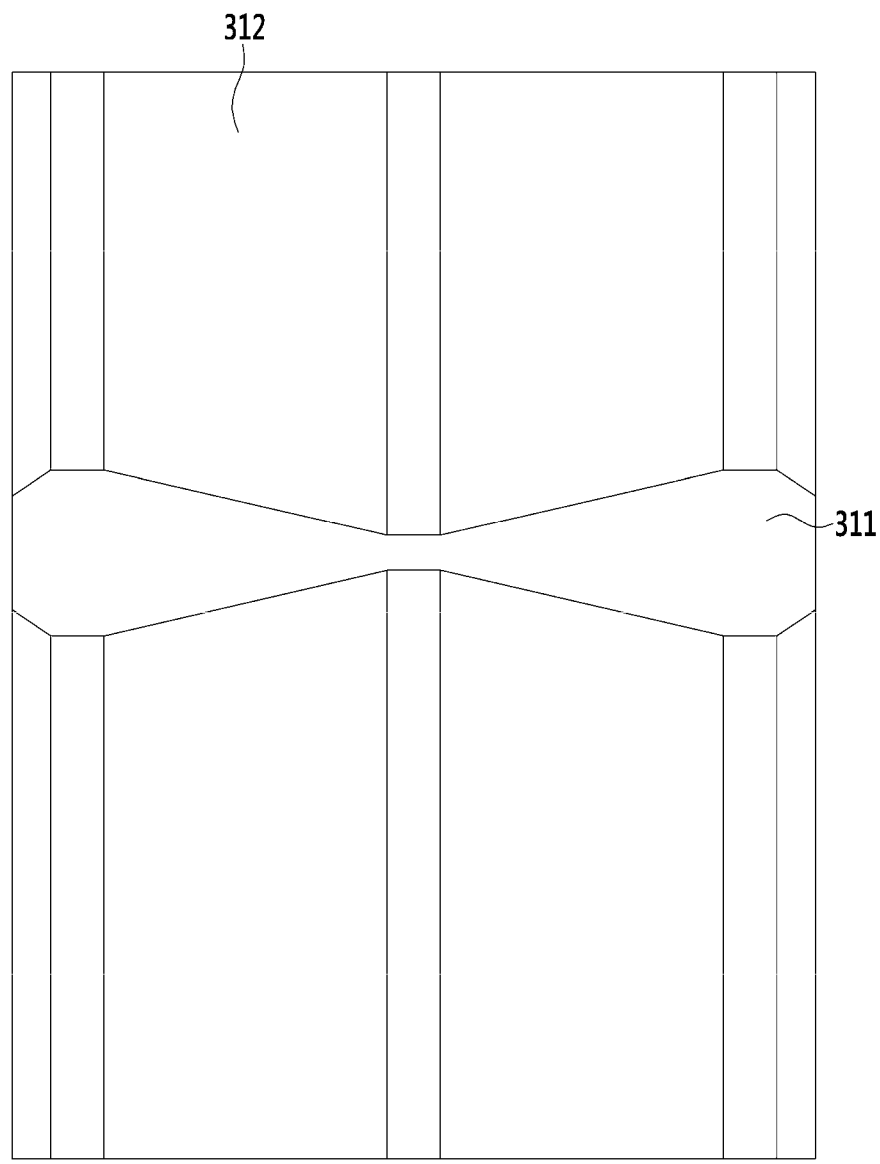
Figure 16B:
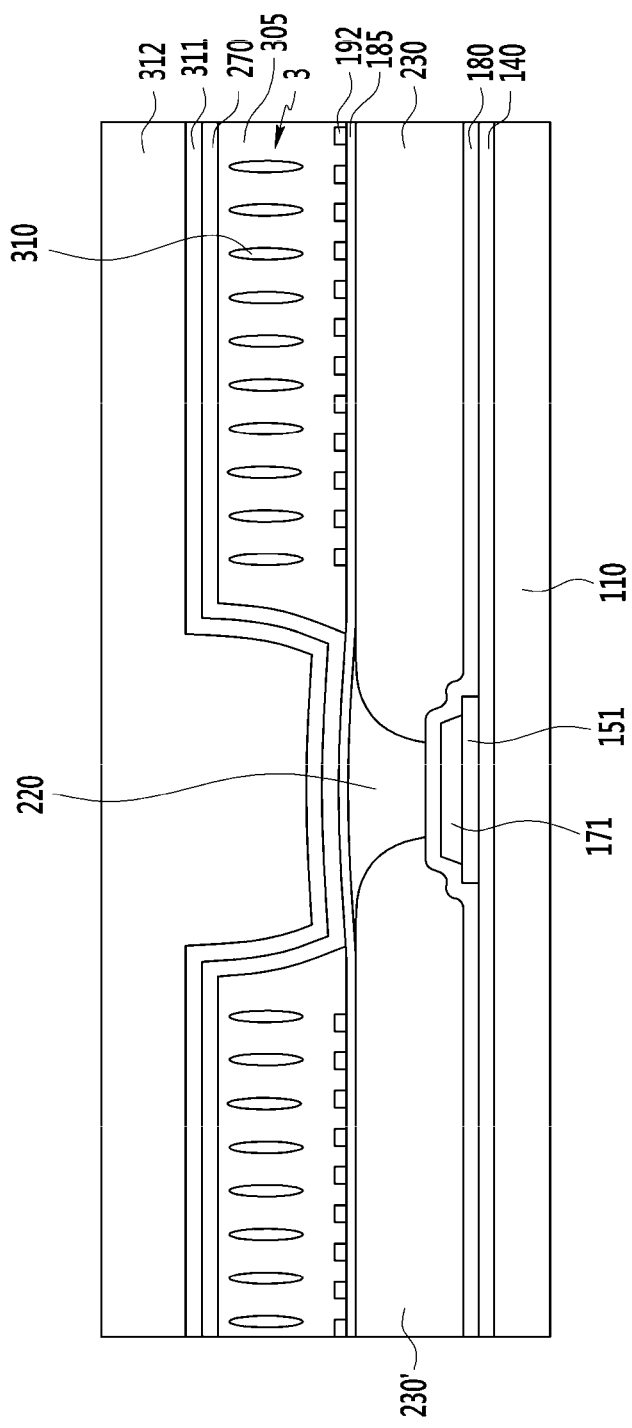
Figure 16C:
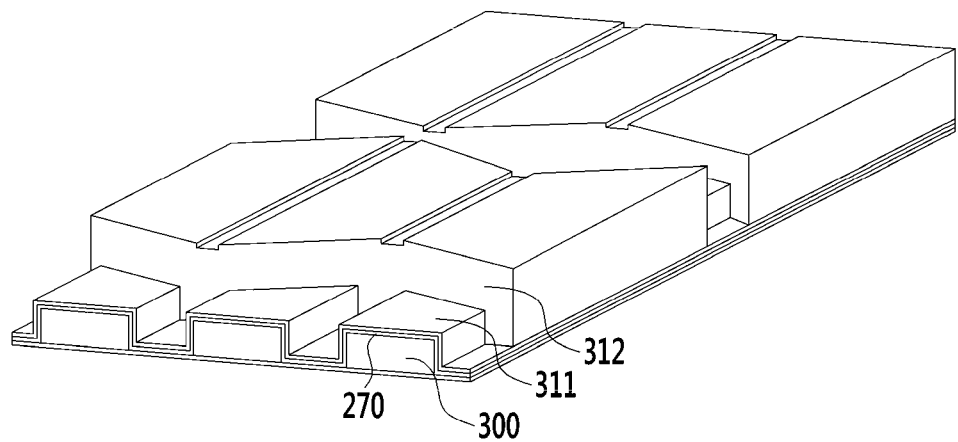

Next, as illustrated in FIGS. 16A to 16C, a roof layer 312 is formed. The roof layer 312 is formed to include an organic material but is not formed in a region (hereinafter, referred to as a "liquid crystal injection hole opening region") which is etched during a process of forming an opening 335. FIG. 16A illustrates that the liquid crystal injection hole opening region is formed so as to correspond to a thin film transistor formation region and has a structure which extends along a gate line formation direction. Further, the roof layer 312 is not formed in a region corresponding to the opening 335, so that in FIGS. 16A to 16C, the lower insulating layer 311 is exposed.

The roof layer 312 is formed such that a material for a roof layer including an organic material is laminated on the entire panel, exposed and developed using a mask, and then a material for a roof layer corresponding to the liquid crystal injection hole opening region is removed. In this case, the lower insulating layer 311 which is formed below the roof layer 312 is not etched and thus exposed. Only the sacrificial layer 300, the common electrode 270, the lower insulating layer 311 is formed in the liquid crystal injection hole opening region. The sacrificial layer 300 or the opening 301, the common electrode 270, the lower insulating layer 311, and the roof layer 312 are laminated in the other region.

The opening 335 which is formed in the roof layer in order to inject the liquid crystal into the pixel 100 is formed to have a predetermined pattern, for example, trapezoidal shape, connected to adjacent opening through a connecting portion. The connecting portion may have a first connecting portion connecting a wide potion and a second connecting portion connecting a narrow portion of the trapezoidal shape. The opening 335 formed between adjacent data lines (vertical direction) may have a first portion having a first width d1 and a second portion having a second width d2.

The portion having the first width d1 is wider than the portion having the second width d2.

The first portion of one opening are connected to a first portion of the adjacent opening via the first connecting portion and the second portion of one opening are connected to a second portion of the adjacent opening via the second connecting portion. In FIG. 16A, a pattern which becomes narrower from the portion having the first width d1 to the portion having the second width d2 is repeated, the liquid crystal may be injected into the portion having the first width d1 in a subsequent process.

Figure 17A:
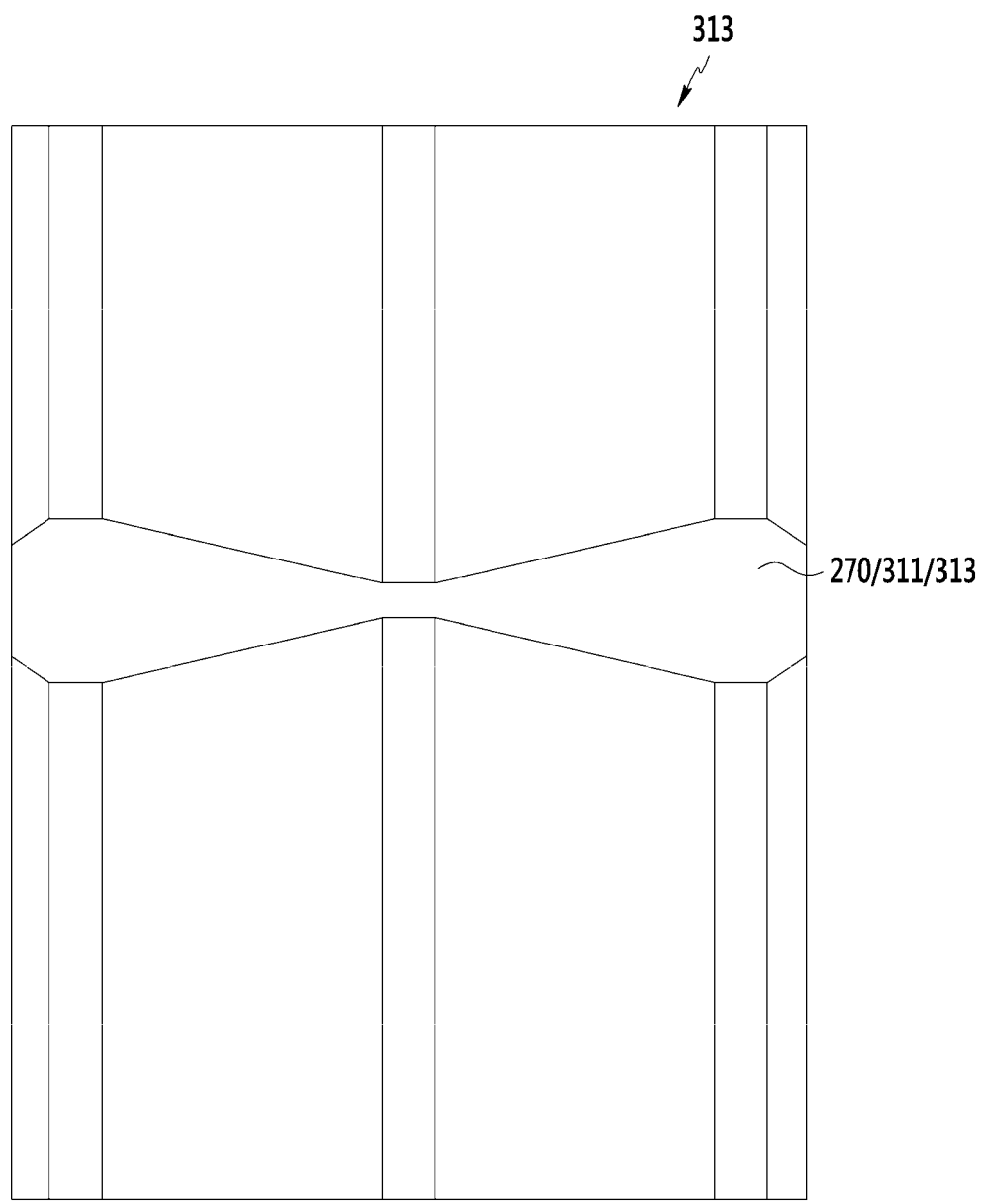
Figure 17B:
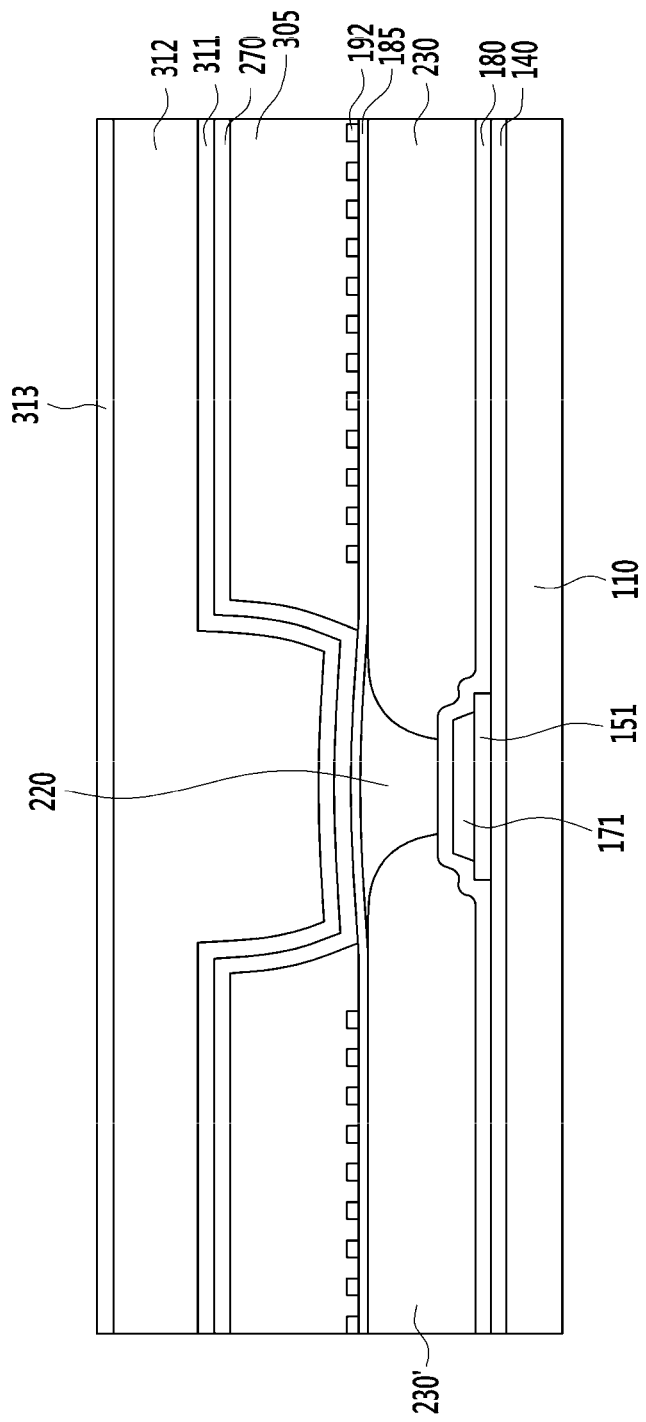
Figure 17C:
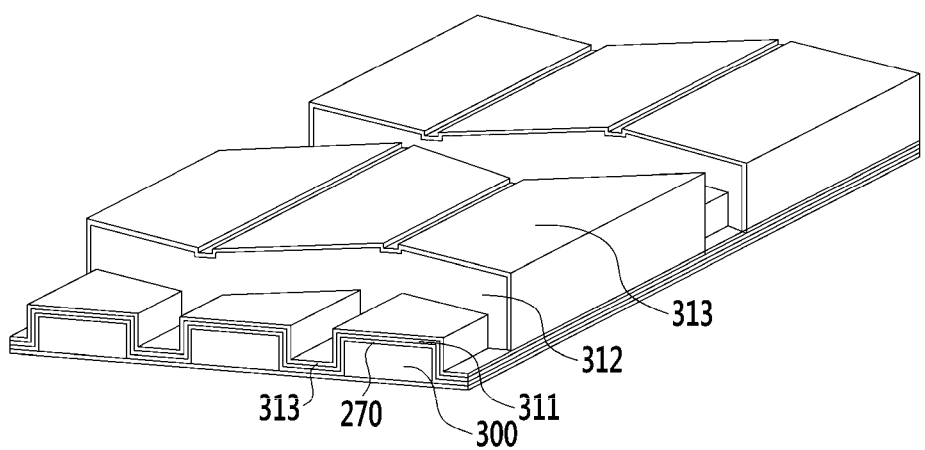

Thereafter, as illustrated in FIGS. 17A to 17C, a material for an upper insulating layer including an inorganic insulating material such as silicon nitride (SiNx) is laminated to form the upper insulating layer 313 on the entire liquid crystal panel.

Figure 18A:
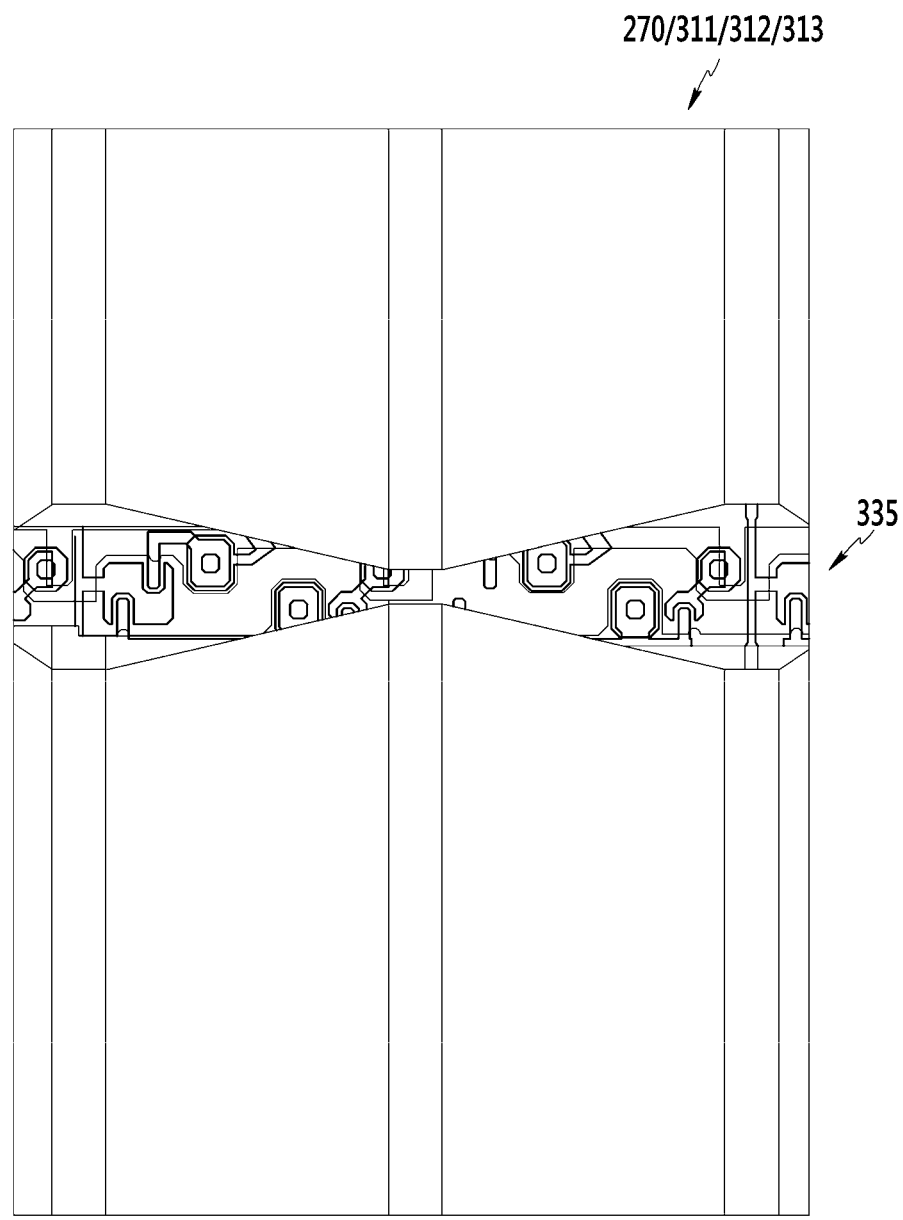
Figure 18B:
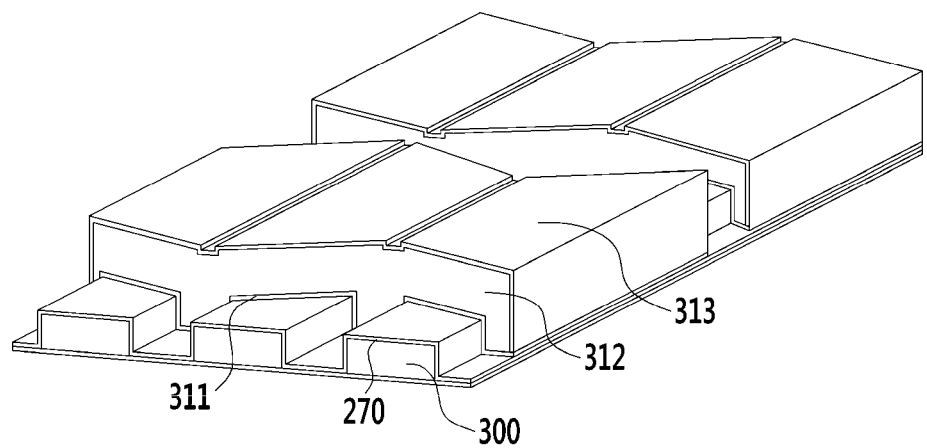
Figure 18C:
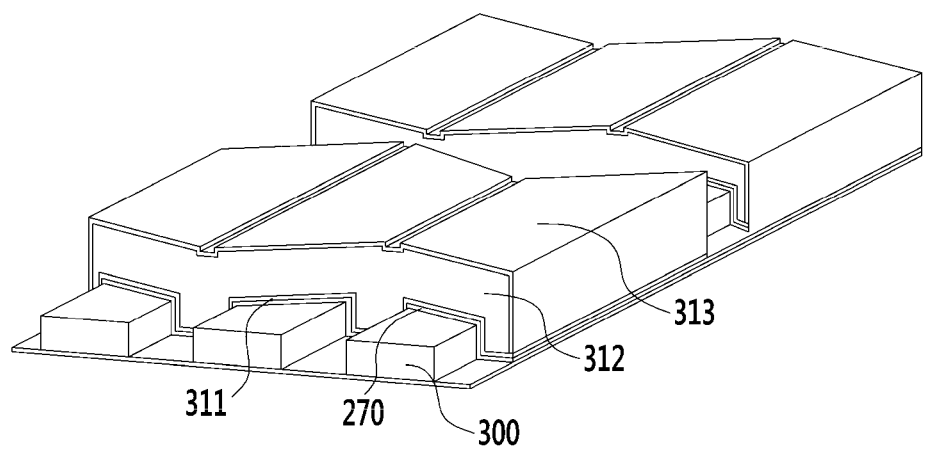
Figure 18D:
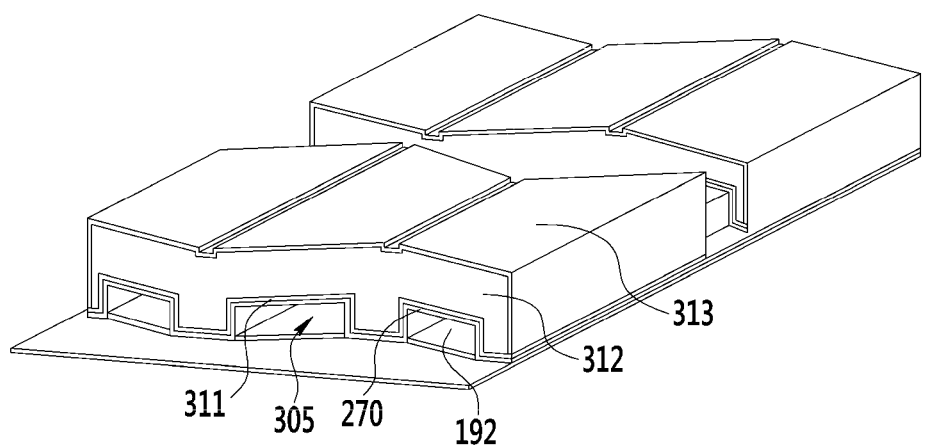

Next, as illustrated in FIGS. 18A and 18D, the liquid crystal injection hole opening region is etched to form an opening 335 including a portion having a first width d1 and a portion having a second width d2.

Specifically, as illustrated in FIG. 18B, the lower insulating layer 311 and the upper insulating layer 313 which are formed in the liquid crystal injection hole opening region are etched to remain the common electrode 270.

Thereafter, as illustrated in FIG. 18C, the common electrode 270 which is formed in the liquid crystal injection hole opening region is etched to expose the sacrificial layer 300. In this case, in some exemplary embodiments, a part of the common electrode 270 remains so as to electrically connect the adjacent common electrodes 270 with each other.

That is, in order to etch an open region for the opening 335, a photo resist RP is formed in the entire region and the photo resist PR corresponding to the liquid crystal injection hole opening region is removed to form a photo resist pattern and then etched along the photo resist pattern to etch the liquid crystal injection hole opening region. In this case, layers which are etched out from the liquid crystal injection hole opening region are the upper insulating layer 313, the lower insulating layer 311, the common electrode 270, and the sacrificial layer 300 and lower layers thereof are not etched. In some exemplary embodiments, only a part of sacrificial layer 300 may be etched or the sacrificial layer 300 may not be etched at all. Here, the etching process of the liquid crystal injection hole open region may be a dry etching process or a wet etching process if an etchant for etching a layer to etch is provided.

Thereafter, as illustrated in FIG. 18D, the exposed sacrificial layer 300 is removed.

Thereafter, as illustrated in FIGS. 4 and 5, the liquid crystal is injected in a portion having the first width d1 of the microcavity 305 to form the liquid crystal layer 3 using a capillary force of the microcavity 305.

As described above, generally, in the case of the liquid crystal display having the EM structure in which a width of the opening 335 is uniform, when the liquid crystal is injected, remaining liquid crystal may present on the roof layer 312 of the pixel 100 due to a small width of the opening 335, which may cause deterioration in a display quality.

Accordingly, in order to inject the liquid crystal without remaining liquid crystal on the roof layer 312, the opening 335 is not formed to have a uniform width. Instead, the opening has a second portion having the second width d2 and a first portion having the first width d1 which is wider than the first width and the liquid crystal is dropped onto the first portion so that the liquid crystal is prevented from remaining on the roof layer 312 of the pixel 100 as illustrated in FIG. 2.

When the opening 335 has only enlarged potion having the first width d1, an area of the pixel 100 region may be reduced, so that an aperture ratio may be lowered. However, because the opening 335 has the first portion having the first width d1 and the second portion having the second width d2 narrower than the first width d1, the aperture ratio may be maintained substantially the same as the liquid crystal display having a uniform width of opening.

Thereafter, even though not illustrated, a capping layer (not illustrated) is formed to block the liquid crystal layer 3 which is injected into the microcavity 305 from being leaked to the outside to perform a process of encapsulating the microcavity 305.

Further, a process of attaching a polarizer (not illustrated) onto the lower portion of the insulation substrate 110 and the upper portion of the upper insulating layer 313 may be added. The polarizer may include a polarizing element which generates polarization and a tri-acetyl-cellulose (TAC) layer which ensures durability and in some exemplary embodiments, transmissive axes of an upper polarizer and a lower polarizer may be perpendicular or horizontal to each other.

In some exemplary embodiments, the lower insulating layer 311 and the upper insulating layer 313 may be omitted.

According to the above-described exemplary embodiment of the inventive concept, the shape of the pixel and the opening is designed to minimize the remaining liquid crystal on a roof layer. Thus, deterioration in a display quality due to the remained liquid crystal on the roof layer may be prevented.

While this inventive concept has been described in connection with what is presently considered to be practical exemplary embodiments, it is to be understood that the inventive concept is not limited to the disclosed embodiments, but, on the contrary, is intended to cover various modifications and equivalent arrangements included within the spirit and scope of the appended claims.

What is claimed is:
1. A liquid crystal display, comprising:
an insulation substrate;
a roof layer which is formed on the insulation substrate and supports a plurality of microcavities;
a pixel electrode which is formed on the insulation substrate and under the microcavity supported by the roof layer; and
a liquid crystal layer which is disposed in the microcavity, wherein the roof layer has an opening through which liquid crystal is injected into the plurality of microcavities, the opening corresponding to unit microcavity includes a first portion having a first width and a second portion having a second width which is different from the first width, and the first portion is wider than the second portion.

2. The liquid crystal display of claim 1, wherein:

openings in adjacent two microcavities share a line of symmetry.

3. The liquid crystal display of claim 2, wherein:

a width of the opening decreases linearly from the first portion to the second portion.

4. The liquid crystal display of claim 3, wherein:

in the opening, the first portion and the second portion are repeatedly formed.

5. The liquid crystal display of claim 2, wherein:

the first portion and the second portion have a predetermined length in a first direction and uniform first width and second width in a second direction substantially perpendicular to the first direction, respectively, and the first portion and the second portion are repeatedly formed.

6. The liquid crystal display of claim 5, wherein:

one pixel includes two first portions and two second portions, the two first portions are disposed in a diagonal direction and the two second portions are disposed in a diagonal direction.

7. The liquid crystal display of claim 5, wherein:

one pixel includes two first portions and two second portions, the two first portions are disposed in a same side of the pixel and the two second portions are disposed in a same side of the pixel.

8. The liquid crystal display of claim 5, wherein:

one pixel includes two first portions and four second portions, the two first portions are disposed on a center of the pixel and the four second portions are disposed on both sides of the two first portions.

9. The liquid crystal display of claim 1, wherein:

the first portion is formed in a position corresponding to one microcavity, and the second portions are formed in a position corresponding to two microcavities.

10. The liquid crystal display of claim 1, further comprising:

a common electrode which is disposed on an upper portion and a side wall portion of the microcavity.

* * * * *